US009185019B2

(12) United States Patent
Kamath et al.

(10) Patent No.: US 9,185,019 B2
(45) Date of Patent: *Nov. 10, 2015

(54) SYSTEMS AND METHODS FOR PROVIDING DYNAMIC CONNECTION SPILLOVER AMONG VIRTUAL SERVERS

(71) Applicant: Citrix Systems, Inc., Fort Lauderdale, FL (US)

(72) Inventors: Sandeep Kamath, Bangalore (IN); Josephine Suganthi, Sunnyvale, CA (US); Anil Shetty, Union City, CA (US); Sergey Verzunov, Moscow (RU)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 51 days.

This patent is subject to a terminal disclaimer.

(21) Appl. No.: 13/929,202

(22) Filed: Jun. 27, 2013

(65) Prior Publication Data
US 2013/0318232 A1 Nov. 28, 2013

Related U.S. Application Data

(63) Continuation of application No. 11/466,238, filed on Aug. 22, 2006, now Pat. No. 8,493,858.

(51) Int. Cl.
*G01R 31/08* (2006.01)
*H04L 12/26* (2006.01)
*H04L 29/08* (2006.01)

(52) U.S. Cl.
CPC ............. *H04L 43/16* (2013.01); *H04L 67/101* (2013.01); *H04L 67/1002* (2013.01); *H04L 67/1008* (2013.01); *H04L 67/1012* (2013.01); *H04L 67/1029* (2013.01); *H04L 67/1031* (2013.01)

(58) Field of Classification Search
CPC ....................................................... H04L 47/10
USPC ........................................................ 370/235
See application file for complete search history.

(56) References Cited

U.S. PATENT DOCUMENTS

| 4,893,307 A | 1/1990 | McKay et al. |
| 5,021,949 A | 6/1991 | Morten et al. |

(Continued)

FOREIGN PATENT DOCUMENTS

| WO | WO-2006/074072 A2 | 7/2006 |
| WO | WO-2008/112691 A2 | 9/2008 |

OTHER PUBLICATIONS

International Preliminary Report on Patentability and Written Opinion for PCT/US2008/056518, mailed on Nov. 28, 2008.

(Continued)

*Primary Examiner* — Samina Choudhry
(74) *Attorney, Agent, or Firm* — Foley & Lardner LLP; Christopher J. McKenna; Shabbi S. Khan

(57) ABSTRACT

A method for an appliance to switch handling of transport layer connection requests from a first virtual server of the appliance managing a first plurality of services to a second virtual server of the appliance managing a second plurality of services upon exceeding, by the first virtual server, a maximum connection threshold determined dynamically from a status of the first plurality of services The appliance establishes a predetermined threshold identifying a maximum active transport layer connection capacity for the first virtual server that comprising a sum of a predetermined connection capacity for each of the plurality of services. The appliance determines via monitoring that the status of a service of the plurality of services indicates the service is not available and adjusts the predetermined threshold to comprise the sum of the predetermined connection capacity for each of the plurality of services having a status of available.

20 Claims, 13 Drawing Sheets

(56) References Cited

U.S. PATENT DOCUMENTS

| | | | |
|---|---|---|---|
| 5,504,744 A | 4/1996 | Adams et al. |
| 5,608,446 A | 3/1997 | Carr et al. |
| 5,633,868 A | 5/1997 | Baldwin et al. |
| 5,724,346 A | 3/1998 | Kobayashi et al. |
| 5,754,774 A | 5/1998 | Bittinger et al. |
| 5,859,971 A | 1/1999 | Bittinger et al. |
| 5,918,020 A | 6/1999 | Blackard et al. |
| 6,006,264 A | 12/1999 | Colby et al. |
| 6,166,729 A | 12/2000 | Acosta et al. |
| 6,175,869 B1 | 1/2001 | Ahuja et al. |
| 6,181,711 B1 | 1/2001 | Zhang et al. |
| 6,182,132 B1* | 1/2001 | Bilakanti et al. ............. 709/223 |
| 6,185,619 B1 | 2/2001 | Joffe et al. |
| 6,247,057 B1 | 6/2001 | Barrera, III |
| 6,298,381 B1 | 10/2001 | Shah et al. |
| 6,314,465 B1 | 11/2001 | Paul et al. |
| 6,324,177 B1 | 11/2001 | Howes et al. |
| 6,336,147 B1 | 1/2002 | Brownell et al. |
| 6,400,685 B1 | 6/2002 | Park |
| 6,412,000 B1 | 6/2002 | Riddle et al. |
| 6,412,007 B1 | 6/2002 | Bui et al. |
| 6,434,618 B1 | 8/2002 | Cohen et al. |
| 6,442,549 B1 | 8/2002 | Schneider |
| 6,452,915 B1 | 9/2002 | Jorgensen |
| 6,463,474 B1 | 10/2002 | Fuh et al. |
| 6,502,131 B1 | 12/2002 | Vaid et al. |
| 6,523,027 B1 | 2/2003 | Underwood |
| 6,546,425 B1 | 4/2003 | Hanson et al. |
| 6,567,813 B1 | 5/2003 | Zhu et al. |
| 6,574,688 B1 | 6/2003 | Dale et al. |
| 6,601,084 B1 | 7/2003 | Bhaskaran et al. |
| 6,601,233 B1 | 7/2003 | Underwood |
| 6,609,128 B1 | 8/2003 | Underwood |
| 6,609,154 B1 | 8/2003 | Fuh et al. |
| 6,625,643 B1 | 9/2003 | Colby et al. |
| 6,633,878 B1 | 10/2003 | Underwood |
| 6,640,248 B1 | 10/2003 | Jorgensen |
| 6,671,262 B1 | 12/2003 | Kung et al. |
| 6,704,873 B1 | 3/2004 | Underwood |
| 6,718,535 B1 | 4/2004 | Underwood |
| 6,763,040 B1 | 7/2004 | Hite et al. |
| 6,801,949 B1 | 10/2004 | Bruck et al. |
| 6,832,260 B2 | 12/2004 | Brabson et al. |
| 6,877,043 B2 | 4/2005 | Mallory et al. |
| 6,882,624 B1 | 4/2005 | Ma |
| 6,882,634 B2 | 4/2005 | Bagchi et al. |
| 6,888,844 B2 | 5/2005 | Mallory et al. |
| 6,891,881 B2 | 5/2005 | Trachewsky et al. |
| 6,898,204 B2 | 5/2005 | Trachewsky et al. |
| 6,928,051 B2 | 8/2005 | Butt et al. |
| 6,954,800 B2 | 10/2005 | Mallory |
| 6,975,655 B2 | 12/2005 | Fischer et al. |
| 6,981,047 B2 | 12/2005 | Hanson et al. |
| 6,988,236 B2 | 1/2006 | Ptasinski et al. |
| 6,993,101 B2 | 1/2006 | Trachewsky et al. |
| 6,996,628 B2 | 2/2006 | Keane et al. |
| 7,000,031 B2 | 2/2006 | Fischer et al. |
| 7,013,387 B2 | 3/2006 | Cihula |
| 7,016,317 B1 | 3/2006 | Pathak et al. |
| 7,028,333 B2 | 4/2006 | Tuomenoksa et al. |
| 7,028,334 B2 | 4/2006 | Tuomenoksa |
| 7,035,285 B2 | 4/2006 | Holloway et al. |
| 7,042,879 B2 | 5/2006 | Eschbach et al. |
| 7,046,645 B1 | 5/2006 | Matsuyama |
| 7,047,424 B2 | 5/2006 | Bendinelli et al. |
| 7,054,944 B2 | 5/2006 | Tang et al. |
| 7,062,560 B1 | 6/2006 | Gourlay |
| 7,085,854 B2 | 8/2006 | Keane et al. |
| 7,099,915 B1 | 8/2006 | Tenereillo et al. |
| 7,100,195 B1 | 8/2006 | Underwood |
| 7,102,996 B1 | 9/2006 | Amdahl et al. |
| 7,116,894 B1 | 10/2006 | Chatterton |
| 7,136,645 B2 | 11/2006 | Hanson et al. |
| 7,181,766 B2 | 2/2007 | Bendinelli et al. |
| 7,197,234 B1 | 3/2007 | Chatterton |
| 7,213,061 B1 | 5/2007 | Hite et al |
| 7,225,244 B2 | 5/2007 | Reynolds et al. |
| 7,310,673 B2 | 12/2007 | Zhu et al. |
| 7,437,428 B1 | 10/2008 | Muti et al. |
| 7,437,594 B1 | 10/2008 | Mount et al. |
| 7,475,157 B1 | 1/2009 | Tormasov |
| 7,480,371 B2 | 1/2009 | Chevalier et al. |
| 7,509,390 B1 | 3/2009 | Raman et al. |
| 7,734,726 B2* | 6/2010 | Dantzig et al. ............... 709/219 |
| 2001/0049717 A1 | 12/2001 | Freeman et al. |
| 2001/0052016 A1* | 12/2001 | Skene et al. .................. 709/226 |
| 2002/0010783 A1 | 1/2002 | Primak et al. |
| 2002/0010866 A1 | 1/2002 | McCullough et al. |
| 2002/0016851 A1 | 2/2002 | Border |
| 2002/0034173 A1 | 3/2002 | Border et al. |
| 2002/0049608 A1 | 4/2002 | Hartsell et al. |
| 2002/0049841 A1 | 4/2002 | Johnson et al. |
| 2002/0059274 A1 | 5/2002 | Hartsell et al. |
| 2002/0065864 A1 | 5/2002 | Hartsell et al. |
| 2002/0065922 A1 | 5/2002 | Shastri |
| 2002/0073061 A1 | 6/2002 | Collins |
| 2002/0098840 A1 | 7/2002 | Hanson et al. |
| 2002/0110084 A1 | 8/2002 | Butt et al. |
| 2002/0138618 A1 | 9/2002 | Szabo |
| 2002/0174227 A1 | 11/2002 | Hartsell et al. |
| 2003/0120811 A1 | 6/2003 | Hanson et al. |
| 2003/0123394 A1 | 7/2003 | Neale et al. |
| 2003/0126183 A1 | 7/2003 | Wu et al. |
| 2003/0149715 A1 | 8/2003 | Ruutu et al. |
| 2003/0167301 A1 | 9/2003 | Zhu et al. |
| 2003/0167302 A1 | 9/2003 | Zhu et al. |
| 2003/0167303 A1 | 9/2003 | Zhu et al. |
| 2003/0167304 A1 | 9/2003 | Zhu et al. |
| 2003/0167305 A1 | 9/2003 | Zhu et al. |
| 2003/0167339 A1 | 9/2003 | Zhu et al. |
| 2003/0167418 A1 | 9/2003 | Zhu et al. |
| 2003/0191838 A1 | 10/2003 | Tsao |
| 2004/0015591 A1 | 1/2004 | Wang |
| 2004/0031052 A1 | 2/2004 | Wannamaker et al. |
| 2004/0114601 A1 | 6/2004 | Watanabe et al. |
| 2004/0199575 A1 | 10/2004 | Geller |
| 2004/0250124 A1 | 12/2004 | Chesla et al. |
| 2005/0083973 A1 | 4/2005 | Krishnan |
| 2005/0198335 A1 | 9/2005 | Brown et al. |
| 2005/0223114 A1 | 10/2005 | Hanson et al. |
| 2005/0223115 A1 | 10/2005 | Hanson et al. |
| 2005/0257258 A1 | 11/2005 | Kinoshita et al. |
| 2006/0029016 A1 | 2/2006 | Peles |
| 2006/0074072 A1 | 4/2006 | Dorsch et al. |
| 2006/0092971 A1 | 5/2006 | Okita et al. |
| 2007/0008974 A1 | 1/2007 | Dispensa et al. |
| 2007/0052016 A1 | 3/2007 | Otake et al. |
| 2007/0255819 A1 | 11/2007 | Hua et al. |
| 2008/0049616 A1 | 2/2008 | Kamath et al. |
| 2008/0049786 A1 | 2/2008 | Ram et al. |
| 2008/0247419 A1 | 10/2008 | Elliot et al. |
| 2009/0172192 A1 | 7/2009 | Christian et al. |
| 2010/0074101 A1 | 3/2010 | Skalecki et al. |
| 2010/0228840 A1 | 9/2010 | Bose et al. |

OTHER PUBLICATIONS

International Search Report for PCT/US2008/056518, mailed on Nov. 28, 2008.
Notice of Allowance for U.S. Appl. No. 11/685,186 dated Jul. 18, 2012.
Notice of Allowance for U.S. Appl. No. 12/609,184 dated May 29, 2012.
Office Action for U.S. Appl. No. 11/466,238 dated Jan. 5, 2011.
Office Action for U.S. Appl. No. 11/466,238 dated Mar. 12, 2012.
Office Action for U.S. Appl. No. 11/466,238 dated Jul. 1, 2011.
Office Action for U.S. Appl. No. 11/685,186 dated May 10, 2011.
Office Action for U.S. Appl No. 12/609,184 dated Dec. 15, 2011.
T. Bemers-Lee, L. Masinter, and M. McCahill. Uniform Resource Locators, RFC 1738, Dee. 1994.
US Notice of Allowance for U.S. Appl. No. 11/466,238 dated Mar. 29, 2013.

(56) References Cited

OTHER PUBLICATIONS

US Office Action for U.S. Appl. No. 11/466,238 dated Oct. 22, 2012.
US Office Action for U.S. Appl. No. 11/466,238 dated Apr. 6, 2009.
US Office Action for U.S. Appl. No. 11/466,238 dated Jul. 9, 2010.
US Office Action for U.S. Appl. No. 11/685,186 dated Oct. 30, 2009.
US Office Action for U.S. Appl. No. 11/685,186 dated Nov. 22, 2010.
US Office Action for U.S. Appl. No. 11/685,186 dated Apr. 30, 2010.
US Office Action for U.S. Appl. No. 11/466,238 dated Dec. 11, 2009.

* cited by examiner

SYSTEMS AND METHODS FOR PROVIDING DYNAMIC CONNECTION SPILLOVER AMONG VIRTUAL SERVERS

CROSS RELATED SECTION

The present application claims priority to and is a continuation of U.S. application Ser. No.: 11/466,238 titled " Systems and Methods for Providing Dynamic Connection Spillover Among Virtual Servers" and filed Aug. 22, 2006, all of which is incorporated herein by reference for all purposes.

FIELD OF THE INVENTION

The present invention relates to computer networking technologies, and more specifically, to using a network appliance practicing a technique of dynamic connection spillover among virtual servers of the appliance.

BACKGROUND OF THE INVENTION

Network appliances are often used to provide access to one or more network services. A network appliance may comprise a number of virtual servers, each virtual server providing access to a number of services. The virtual servers may manage incoming connections from clients, and perform a number of other functions for the connections including connection pooling, caching, and acceleration. In the course of managing incoming connection requests, network appliances may provide load balancing among the virtual servers. One method of load balancing includes assigning a connection capacity to a virtual server based on a total connection capacity for the services to which the virtual server provides access. When the number of connections to a virtual server exceeds this capacity, new connection requests may be routed to a second virtual server.

One drawback of this approach is that it cannot compensate for the failure of one or more of the services. A failure of one services may significantly reduce the number of connections for which a virtual server can provide service.

It would, therefore, be desirable to provide systems and methods to dynamically determine a connection capacity for a virtual server providing access to one or more services.

SUMMARY OF THE INVENTION

In one aspect, the present invention relates to a method for an appliance to switch handling of transport layer connection requests from a first virtual server of the appliance managing a first plurality of services to a second virtual server of the appliance managing a second plurality of services upon exceeding, by the first virtual server, a maximum connection threshold determined dynamically from a status of the first plurality of services. The method comprising the steps of: establishing, on an appliance, a first virtual server which directs transport layer connection requests from a plurality of clients to a first plurality of services; establishing, via the appliance, a predetermined threshold identifying a maximum active transport layer connection capacity for the first virtual server, the predetermined threshold comprising a sum of a predetermined connection capacity for each of the plurality of services; monitoring, by the appliance, a status for each of the plurality of services; determining, by the appliance, the status of a service of the plurality of services indicates the service is not available; and adjusting, by the appliance in response to the determination, the predetermined threshold to comprise the sum of the predetermined connection capacity for each of the plurality of services having a status of available.

In another aspect, the present invention relates to a computer implemented system to switch handling of transport layer connection requests from a first virtual server of the appliance managing a first plurality of services to a second virtual server of the appliance managing a second plurality of services upon exceeding, by the first virtual server, a maximum connection threshold determined dynamically from a status of the first plurality of services. The system comprises: a network appliance which establishes a first virtual server that directs transport layer connection requests from a plurality of clients to a first plurality of services; establishes, a predetermined threshold identifying a maximum active transport layer connection capacity for the first virtual server, the predetermined threshold comprising a sum of a predetermined connection capacity for each of the plurality of services; monitors a status for each of the plurality of services; determines the status of a service of the plurality of services indicates the service is not available; and adjusts in response to the determination, the predetermined threshold to comprise the sum of the predetermined connection capacity for each of the plurality of services having a status of available.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
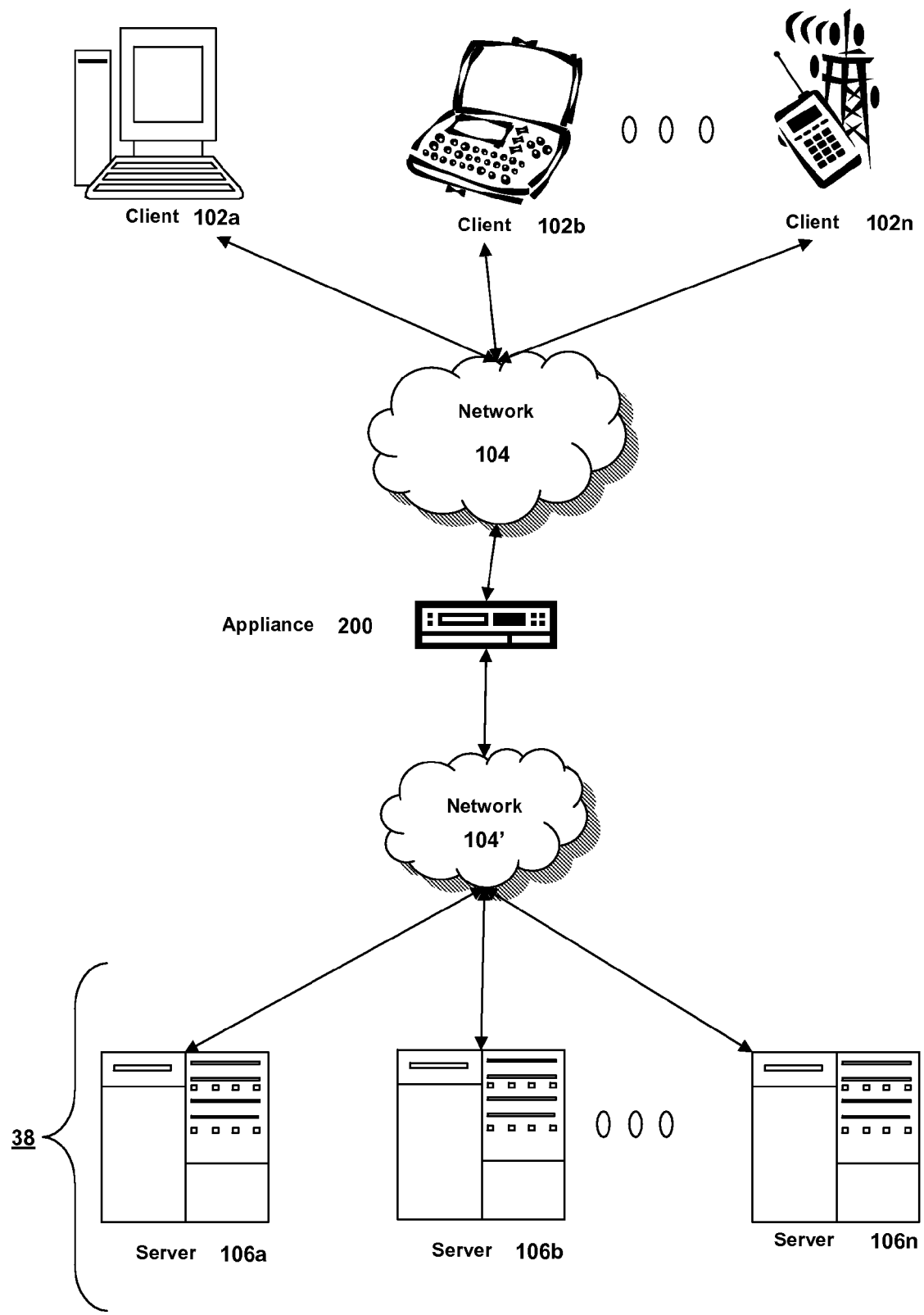
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
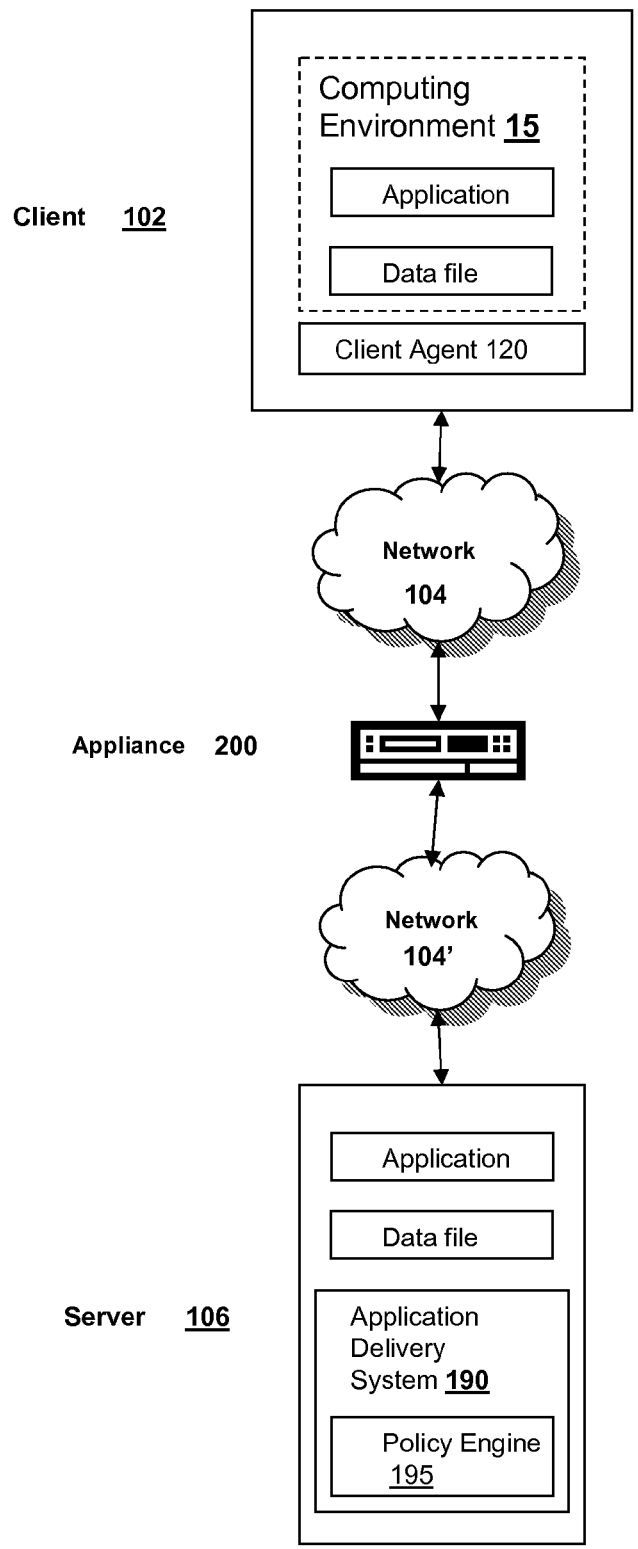
FIG. 1B is a block diagram of an embodiment of an environment for delivering a computing environment from a server to a client via an appliance.

Referring now to FIG. 1B, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Figure 1C:
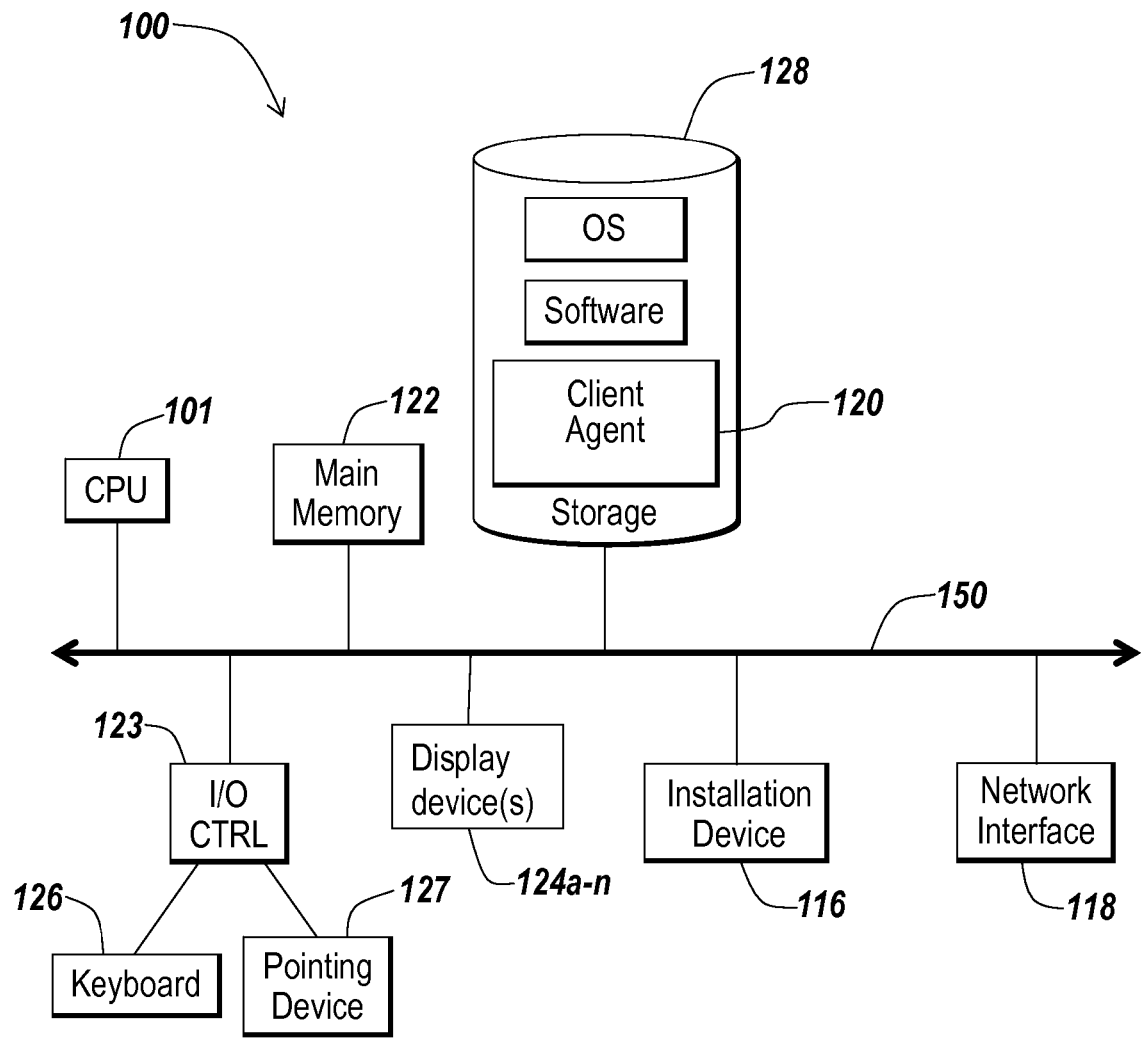
FIGS. 1C and 1D are block diagrams of embodiments of a computing device.
Figure 1D:
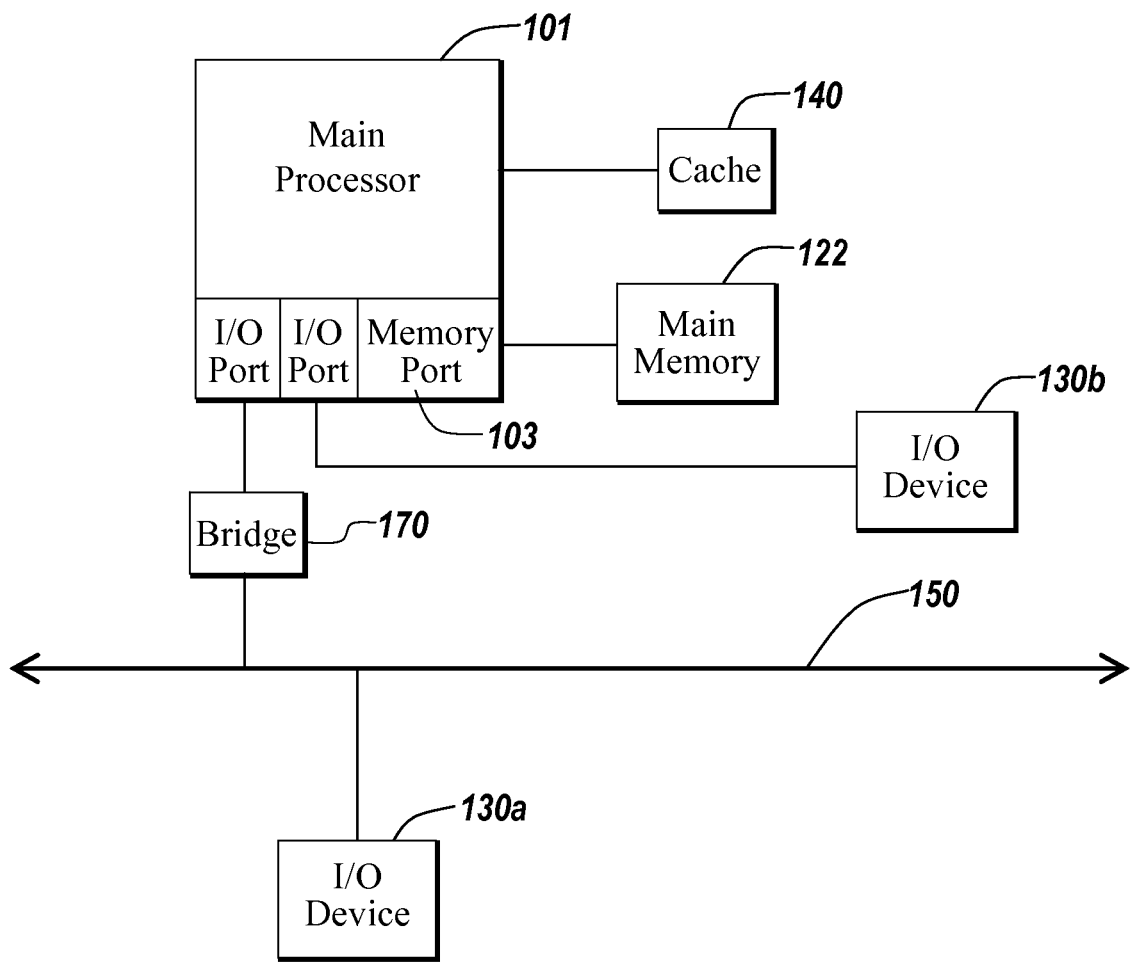

The client 102, server 106, and appliance 200 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the client 102, server 106 or appliance 200. As shown in FIGS. 1C and 1D, each computing device 100 includes a central processing unit 101, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130*a*-130*b* (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Illinois; those manufactured by Transmeta Corporation of Santa Clara, Calif.; the RS/6000 processor, those manufactured by International Business Machines of White Plains, New York; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, California; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
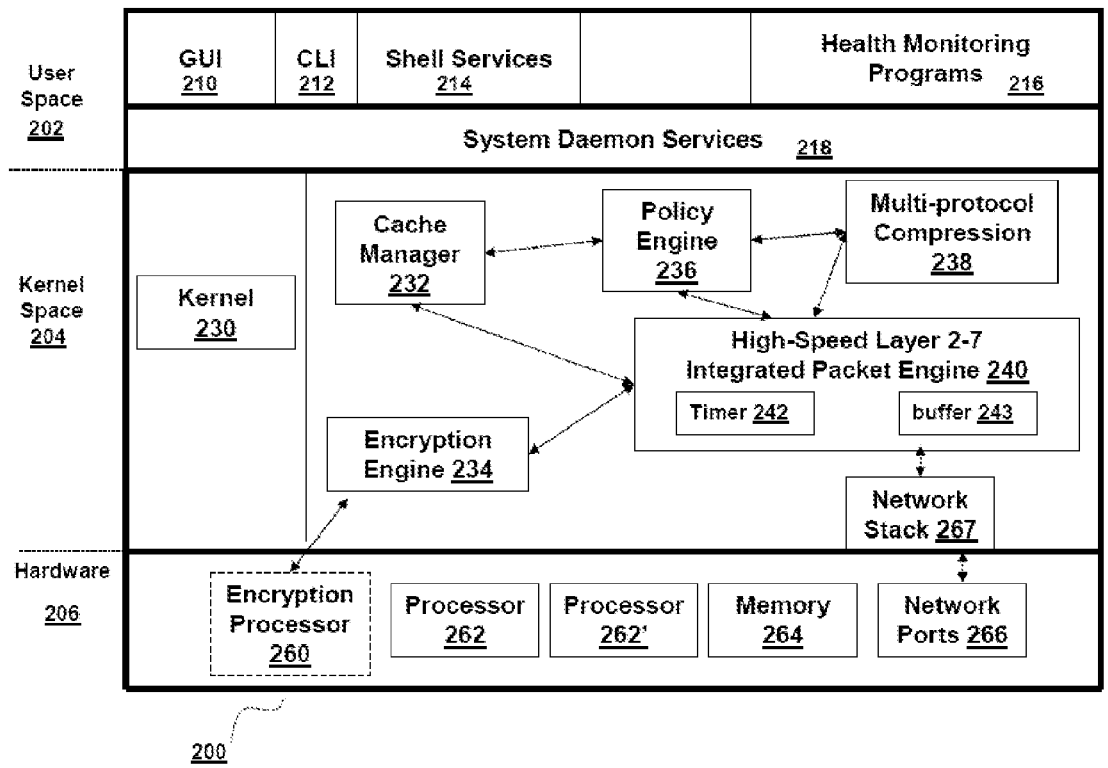
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1C and 1D. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1C and 1D. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any realtime operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232. sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element nat comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
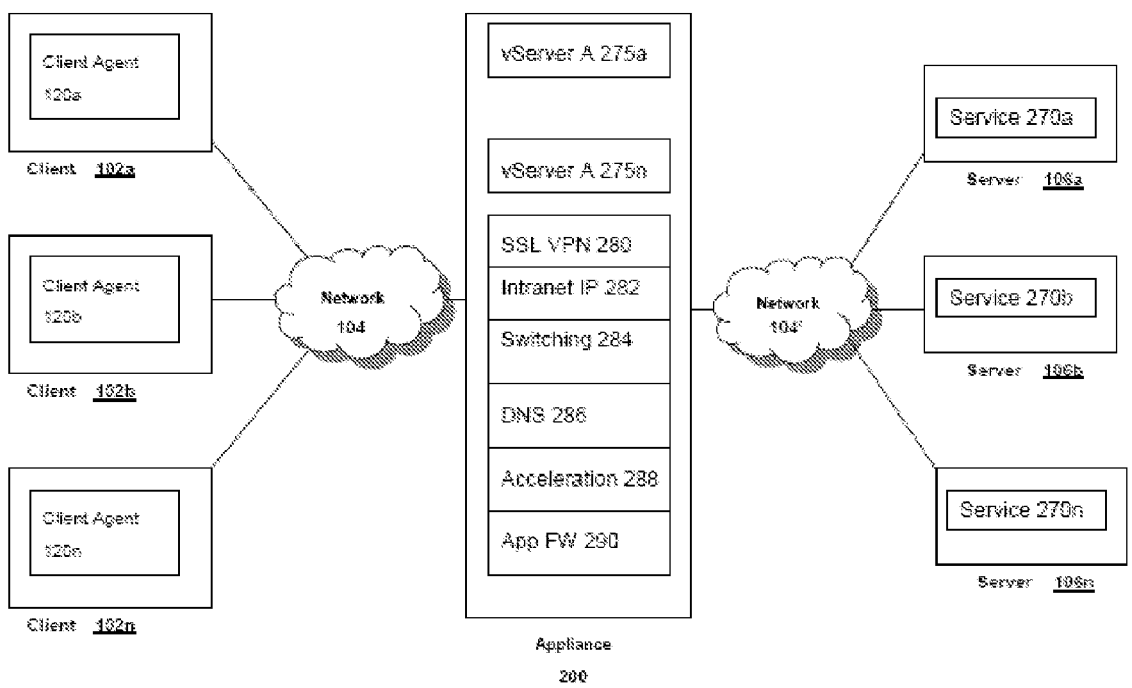
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. In one embodiment, the appliance 200 comprises any of the network devices manufactured by Citrix Systems, Inc. of Ft. Lauderdale Fla., referred to as Citrix NetScaler devices. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching.

In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

C. Client Agent

Figure 3:
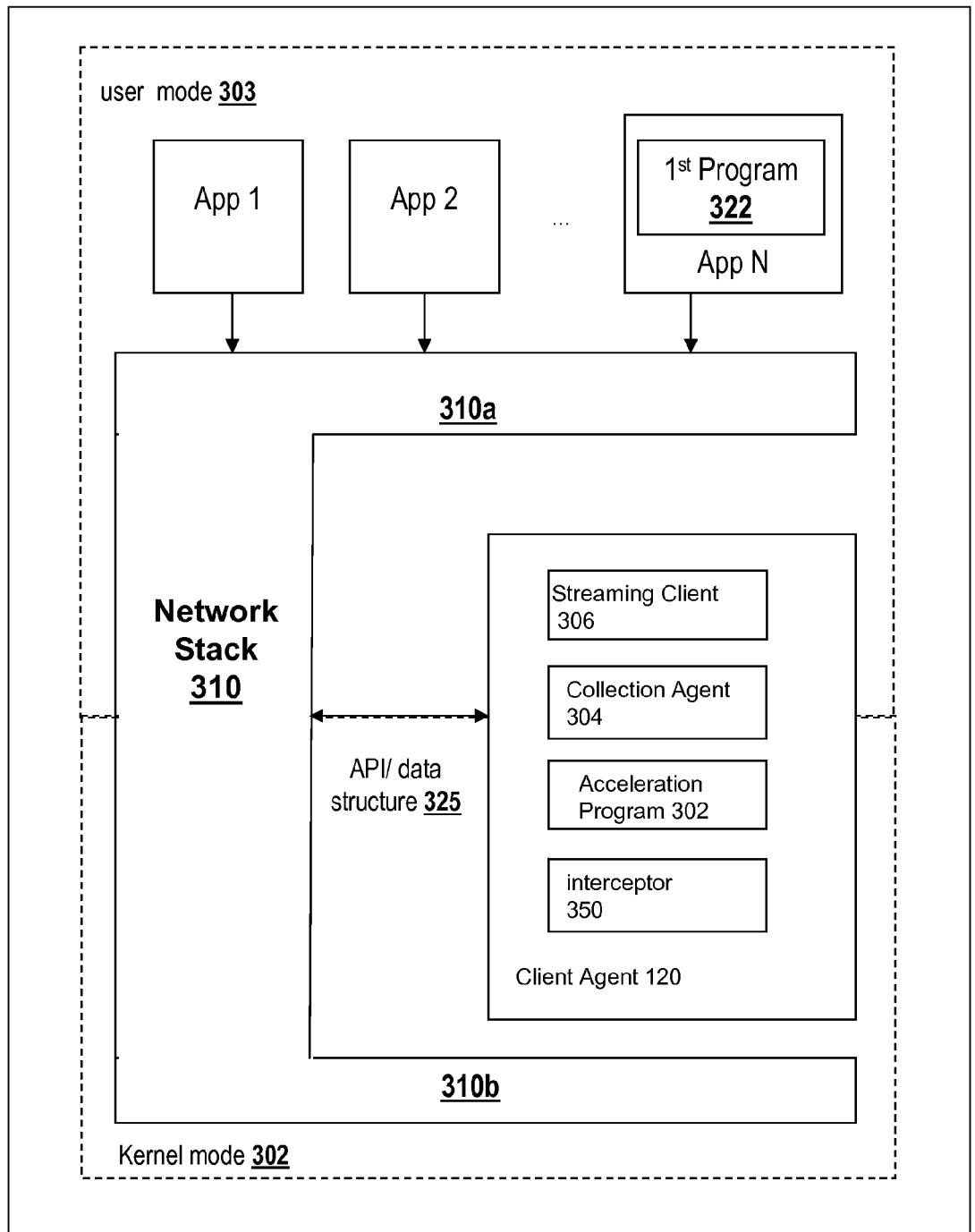
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4)

transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310*a* of the network stack may provide user-mode access to the network stack 310 to an application while a second portion 310*a* of the network stack 310 provides access to a network. In some embodiments, a first portion 310*a* of the network stack may comprise one or more upper layers of the network stack 310, such as any of layers 5-7. In other embodiments, a second portion 310*b* of the network stack 310 comprises one or more lower layers, such as any of layers 1-4. Each of the first portion 310*a* and second portion 310*b* of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, and/or a collection agent 304. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as payload of network packet of the transport layer protocol The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. Decentralized Dynamic Load Balancing

Figure 4A:
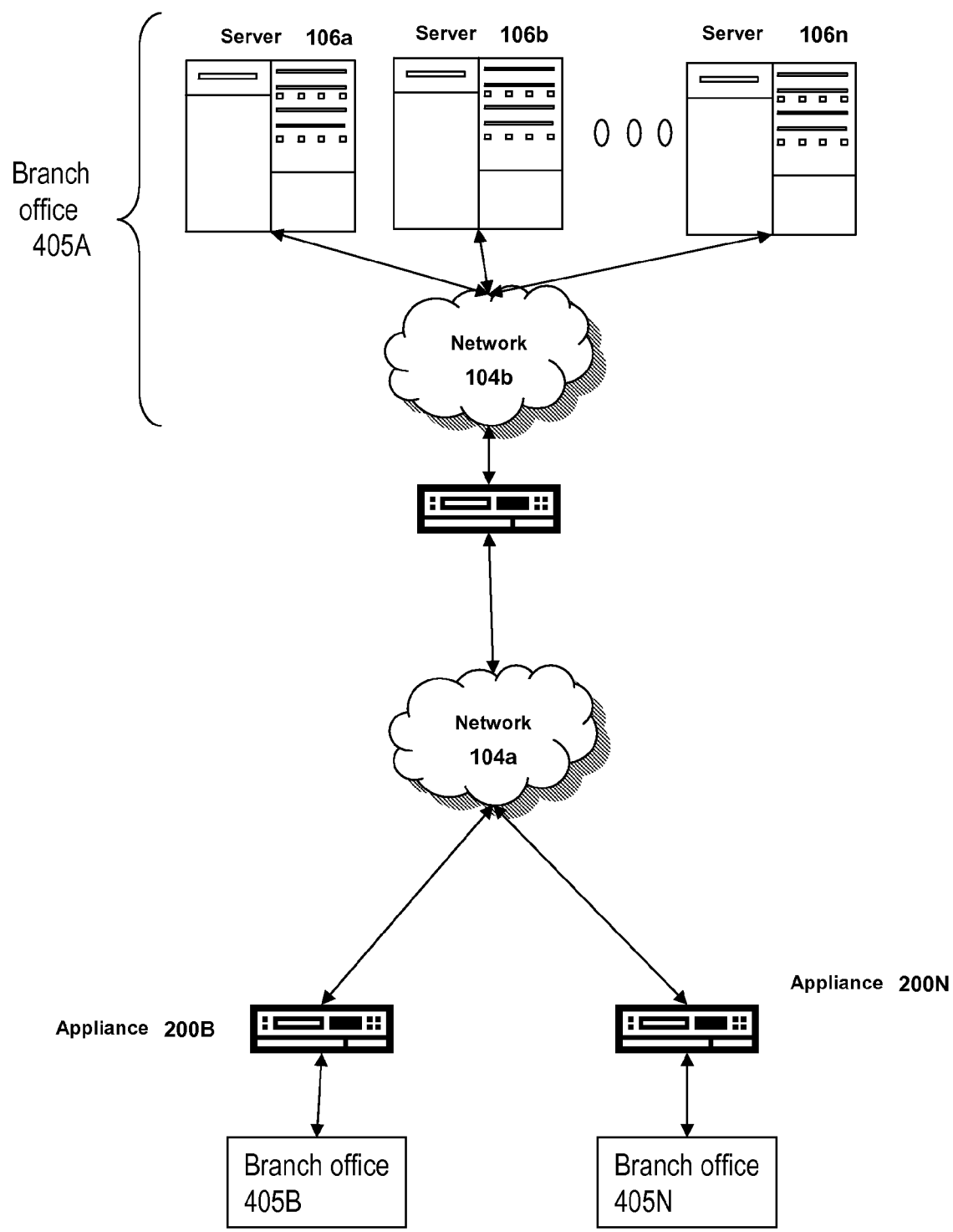
FIG. 4A is one embodiment of a network of appliances for load balancing resources across branch offices.

Referring now to FIG. 4A, an embodiment of a network of appliances for load balancing resources across branch offices is depicted. In brief overview, a plurality of appliances 200 are connected to and provide access to a plurality of branch offices 405A-405N. Each branch office may comprise a network 104b and one or more servers 106. The plurality of appliances are connected via a network 104a, by which they may communicate information corresponding to the appliances and the branch offices for load balancing purposes. Each appliance 200 may monitor the set of servers 106 to which it provides access, and report operational and performance characteristics of the network services 270 executing on the servers 106 to one or more other appliances 200.

Still referring to FIG. 4A, now in greater detail, in some embodiments, the appliances providing access to branch offices 200 may provide any of the functionality, operations and services of an appliance 200 described in conjunction with FIGS. 2A and 2B. The branch office appliances 200A-200N may provide acceleration 288, load balancing/switching 284, SSL VPN 280 and/or application firewall services 290 to any of the computing devices and users of its respective branch office 405A-405N. In one embodiment, each of the branch office appliances 200A-200N provide the same functionality, operations and service. In other embodiments, each of the branch office appliance 200 may provide different functionality, operations or services than another branch office appliance. For example, a first branch office appliance 200A may provide for SSL VPN 280 and acceleration 288, and a second branch office appliance 200B may provide load balancing/switching 284 with SSL VPN 280. A third branch office appliance 200N may provide only SSL VPN 280 and a fourth branch office appliance 200N, acceleration 288. Further to the example, a fifth branch office appliance 200B may provide acceleration 288 while a sixth branch office appliance 200C provides application firewall 290 functionality.

Although branch office appliances 200 are generally described as an appliance 200 in a branch office 405, the branch office appliance 200 may be an appliance 200 deployed at any location in a network. For example, a branch office appliance 200 may be deployed at a data center. In another example, a branch office appliance 200 may be deployed on a subnet or network segment of a corporate LAN 104. In another embodiment, a branch office appliance 200A may be deployed on a first corporate LAN and a second branch office appliance 200B on a second corporate LAN. So, although the appliance 200 is described in FIG. 4A as a branch office appliance 200, it is not limited to operations only at a branch office 405.

In one embodiment, a branch office appliance 200 requests operational or performance information from or otherwise monitors each of the servers 106 or network services 270 it provides access to. In some embodiments, the branch office appliance 200 requests information upon establishment of the connection to a server 106. In another embodiment, the branch office appliance 200 requests information or otherwise monitors a network service 270 on a predetermined frequency, such as every 1 sec, or 1 msec. For example, a branch office appliance 200 may poll each of its connected servers 106 every 1 sec for availability. In some embodiments, a branch office appliance 200 requests availability information from connected network services 270 over a predetermined time period, such as every 1 sec for an hour. In yet another embodiment, a branch office appliance 200 requests information from connected servers 106 upon an event, such as receiving a request from a client 102, or receiving a DNS request. The information requested may comprise any operational or performance characteristic. In some embodiments, an appliance 200 may use one or more monitoring agents to monitor a network service 270, as will be discussed in detail with respect to FIG. 4B.

In some embodiments, the operational and/or performance characteristic information 410 includes information on any of the following for a network service 270: 1) load, 2) numbers and types of connections, 3) resource usage, 4) resource availability, 5) number of requests outstanding, 6) number of requests transmitted, 7) number of clients servicing, 8) response time information, including average and historical response times, 9) errors, status, performance or bandwidth of a connection, 10) number of sessions, and states or status thereof, and 11) a weight assigned to the server.

In one embodiment, a branch office appliance 200 may calculate or be configured with an assigned weight for a network service 270, and the weight may subsequently be used for load balancing purposes. This weight may be calculated or configured in response to any of the performance characteristics described above. A weight may be an integer, decimal number, or any other type of numeric indicator. In some embodiments, weights may be assigned to network services 270 based on the capacity of the server hosting the service. In one embodiment, an appliance may be preconfigured with the capacities of the network services 270 of the branch office to which it provides access, and may calculate weights based on these capacities. In another embodiment, an appliance may query a network service 270 to determine the service's capacity.

In one embodiment, the weight assigned to a network service 270 may reflect a ratio of the network service 270 capacity as compared to the capacity of at least one other network service 270. For example, two network services 270 having equal capacities of servicing 1000 requests per second may be assigned equal weights. Or for example, a network service 270 having a capacity of servicing 1000 requests per second may be assigned a weight corresponding to half the weight assigned to a network service 270 capable of servicing 2000 requests per second. Or for example, a network service 270 having a capacity of 3000 requests/second might be assigned a weight of 5, a network service 270 having a capacity of servicing 6000 requests/second might be assigned a weight of 10, and a network service 270 having a capacity of servicing 9000 requests/second might be assigned a weight of 15. Or, for example, weights may be assigned to network services 270 by dividing the network service's capacity by a fixed number.

In another embodiment, weights may be assigned to servers based on server capacity minus load. In this embodiment, the weight represents the available capacity for the server. For example, a first network service 270 capable of handling 2000 requests per second, and which has a current average load of 1500 requests per second may have an available capacity of 500 requests/second. A second network service 270 capable of handling 2000 requests per second, and which has a current average load of 1000 requests per second may have an available capacity of 1000 requests/second. The second network service 270 may be assigned a weight double the weight of the first network service 270, reflecting that it has twice the available capacity.

In one embodiments, the appliances 200 receive information from a respective branch office appliance via a local area network connection. In some embodiments, the a branch office appliances 200 establish or communicate via a transport layer connection, such as a TCP or UDP connection. In other embodiments, the branch office appliances 200 maintain a connection with each other. In other embodiments, the branch office appliances 200 establish connections to each other on an as needed basis, e.g., connect and reconnect when they need to communicate.

In one embodiment, a first branch office appliance 200A transmits, to a second branch office appliance 200, weight or availability information corresponding to one or more network services 270. The second branch office appliance 200B stores the received information In some embodiments, this received information is aggregated or combined with information received from other branch office appliances 200. The branch office appliances 200A-200N may exchange or provide information once, or on a predetermined frequency, such as every 1 msec or 1 sec. In some embodiments, the first and second branch office appliances 200 use a request/reply messaging mechanism or protocol to transmit information to each other. In other embodiments, the first and second branch office appliances 200 have a custom or proprietary exchange protocol for exchanging information.

In some embodiments, a branch office appliance 200 establishes a connection or communicates with a predetermined number of other branch office appliances 200. In other embodiments, the branch office appliance 200 collects and aggregates information from a predetermined number of branch office appliances 200. In one embodiment, the predetermined number of branch offices is 31. In another embodiments, the predetermined number of branch offices is 32. In yet other embodiments, the predetermined number of branch offices is 16, 48, 60, 96, 128 or 256. In a further embodiment, the predetermined number of branch offices is 10, 20, 30, 40, 50, 60, 70, 80, 90, 100, 150, 200 or 250. The number of branch offices a branch office appliance 200 may connect to or collect information from may depend on the operational or performance characteristics of the network 104a, the appliance 200, the branch offices 405, and branch office networks 104b along with the applications, data, and resource usage of the users across branch offices. In some embodiments, the predetermined number of branch office appliances 200 may not be set or configured, or otherwise limited only by the memory, capacity and performance of the branch office appliance 200.

In another embodiment, a branch office appliance 200 requests information from each of the branch office appliance 200 it is connected to. In some embodiments, the branch office appliance 200 requests information upon establishment of the connection to another branch office appliance 200. In another embodiment, the branch office appliance 200 requests information from another branch office appliance 200 on a predetermined frequency, such as every 1 sec, or 1 msec. For example, a branch office appliance 200 may poll each of its connected branch office appliances 200A-200N every 1 sec for information 410. In some embodiments, a branch office appliance 200 requests information 410 from another branch office appliance 200 over a predetermined time period, such as every 1 sec for an hour. In yet another embodiment, a branch office appliance requests information 410 from a branch office appliance 200 upon an event, such as receiving a request from a client 102, or receiving a DNS request.

The information transmitted among the branch office appliances 200 may comprise any type and form of data, statistics, status or information related to or associated with the operational and/or performance characteristics of a branch office appliance 200, a network 104 of the branch office appliance 200, and/or any connection to a branch office appliance 200, such as via a client 102, server 106 and network service 270. In some embodiments, the information 410 comprises operational and/or performance data on any client 102, server 106, or network service 270 connected to the branch office appliance 200. In one embodiment, the branch office appliance 200 determines operational and/or performance information about any network service 270 it is connected to or servicing, and creates information on these network services 270. In this embodiment, the branch office appliance 200 may provide this information 410 to the other branch office appliances 200.

Figure 4B:
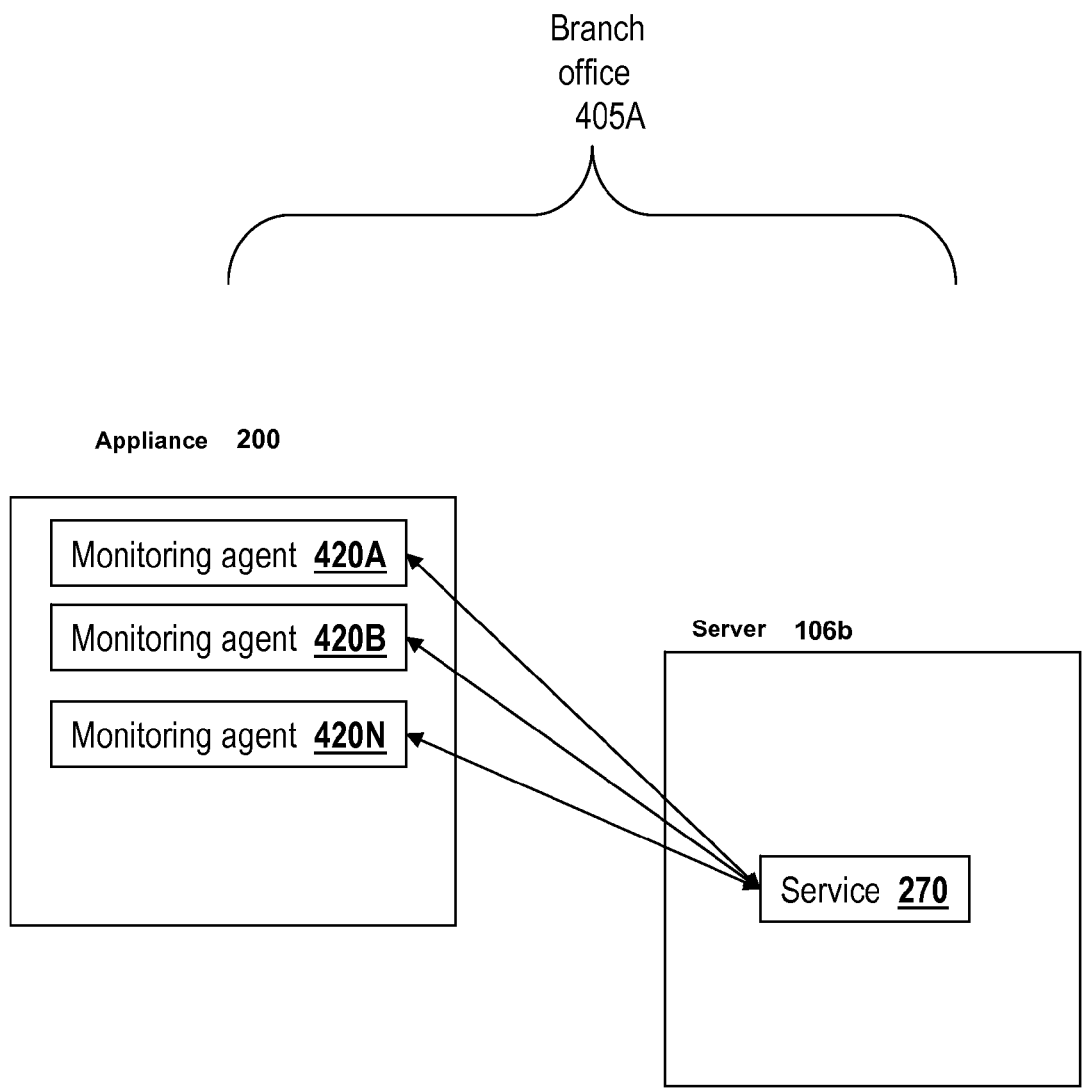
FIG. 4B is a block diagram of an appliance using a plurality of monitoring agents to monitor a network service.

Referring now to FIG. 4B, a block diagram of an appliance using a plurality of monitoring agents to monitor a network service is shown. In brief overview, an appliance 200 comprises a plurality of monitoring agents 420. Each of the plurality of monitoring agents is assigned to monitor a service 270. In one embodiment, each of the plurality of monitoring agents may be assigned a weight. Monitoring agents 420 may also be referred to as probes.

Still referring to FIG. 4B, an appliance comprises a plurality of monitoring agents 420. A monitoring agent may comprise any program, script, daemon, or other computing routine that reports a performance or operational characteristic of a network service 270 to the appliance 200. A monitoring agent may communicate with a network service 106 once, or on a predetermined frequency, such as every 1 msec or 1 sec. In some embodiments, a monitoring agent may use a request/reply messaging mechanism or protocol with the server. In other embodiments, a monitoring agent 402 may have a custom or proprietary exchange protocol for communicating with the server. In some embodiments, a single monitoring agent may monitor a plurality of servers. In other embodiments, a plurality of agents may monitor a single server. In still other embodiments, a plurality of monitoring agents may each monitor a plurality of servers, wherein each of the plurality of servers is monitored by a plurality of monitoring agents.

In the embodiment shown, the one or more monitoring agents 420 are associated with one or more network services 270. In other embodiments, the one or more monitoring agents may monitor an appliance 200, vServer, network service 270, client, or any other network resource. In one embodiment, a user specifies a type of network service to associate with the one or more monitoring agents 420. In another embodiment, a user customizes a monitoring agent. In still another embodiment, a generic monitoring agent 420 is used. In yet another embodiment, the one or more monitoring agents 420 determine the response time of the one or more network services 270 for responding to a request of one of the following types: ping, transport control protocol (tcp), tcp extended content verification, hypertext transfer protocol (http), http extended content verification, hypertext transfer protocol secure (https), https extended content verification, user datagram protocol, domain name service, and file transfer protocol.

In some embodiments, the one or more monitoring agents 420 are protocol-specific agents, each agent determining availability for a network service of a particular protocol-type. In some embodiments, a monitoring agent 420 determines a response time of a server 106 or network service 270 to a TCP request. In one of these embodiments, the agent uses a "TCP/ICMP echo request" command to send a datagram to the network service 270, receive a datagram from the network service 270 in response, and determine a response time based on the roundtrip time of the datagram. In another of these embodiments, the monitoring agent 420 verifies that the response from the network service 270 included expected content and did not contain errors.

In other embodiments, a monitoring agent 420 determines availability of a network service 270 to a UDP request. In one of these embodiments, the agent uses a "UDP echo" command to send a datagram to the network service 270, receive a datagram from the network service 270 in response, and determine a response time based on the roundtrip time of the datagram. In another of these embodiments, the monitoring agent 420 verifies that the response from the network service 270 included expected content and did not contain errors.

In still other embodiments, the monitoring agent 420 determines availability of a network service 270 to an FTP request. In one of these embodiments, the monitoring agent 420 sends an FTP command, such as a "get" command or a "put" command, to the network service 270 and determines a time needed by the network service 270 to respond to the command. In another of these embodiments, the monitoring agent 420 verifies that the response from the network service 270 included expected content, such as contents of a file requested by a "get" command, and did not contain errors.

In yet other embodiments, the monitoring agent 420 determines availability of a network service 270 to an HTTP request. In one of these embodiments, the monitoring agent 420 sends an HTTP command, such as a "get" request for a uniform resource locator (URL) or a file, to the network service 270 and determines a time needed by the network service 270 to respond to the request. In another of these embodiments, the monitoring agent 420 verifies that the response from the network service 270 included expected content, such as the contents of a web page identified by the URL, and did not contain errors.

In further embodiments, the monitoring agent 420 determines availability of a network service 270 to a DNS request. In one of these embodiments, the monitoring agent 420 sends a DNS request, such as a dnsquery or nslookup for a known network address, to the server 106 or network service 270 and determines a time needed by the server 106 or network service 270 to respond to the request. In another of these embodiments, the monitoring agent 420 verifies that the response from the network service 270 included expected content, such as the domain name of a computing device 100 associated with the known network address, and did not contain errors.

A monitoring agent 420 may be assigned a weight by a network appliance 200. A weight may comprise an integer, decimal, or any other numeric indicator. In some embodiments, a user may configure the weight corresponding to a given monitoring agent 420. In some embodiments, all monitoring agents may be assigned equal weight. In other embodiments, a plurality of monitoring agents may each be assigned different weights. The weights may be assigned to the monitors based on any criteria indicating relative importance, including without limitation importance of the monitored service, reliability of the monitoring mechanism, and the frequency of monitoring.

In one embodiment, a monitoring agent may be assigned a weight based on the relative importance of the service the appliance monitors. For example, if most user requests in a given environment were HTTP requests, a monitoring agent monitoring HTTP availability of a server 106 might be assigned a weight of 10, while a monitoring agent monitoring FTP availability of a server 106 might be assigned a weight of 3. Or, for example, if an administrator placed a high priority on UDP applications, a monitoring agent monitoring UDP availability of a server may be assigned a weight of 20, while a DNS monitoring agent may be assigned a weight of 5.

In some embodiments, an appliance 200 may compute a sum of the weights of the monitoring agents currently reporting a network service 270 as operational. For example, if five monitoring agents, each assigned a weight of 30, are monitoring a network service 270, and three of the five monitoring agents report the network service 270 as available, the appliance may determine the sum of the monitoring agents currently reporting the network service 270 as operational to be 90. Or for example, if only two monitoring agents, one with a weight of 20 and the other with a weight of 40, are reporting a server 106 as available, the appliance may compute the sum of the monitoring agents currently reporting a server 106 as operational to be 60.

Figure 5:
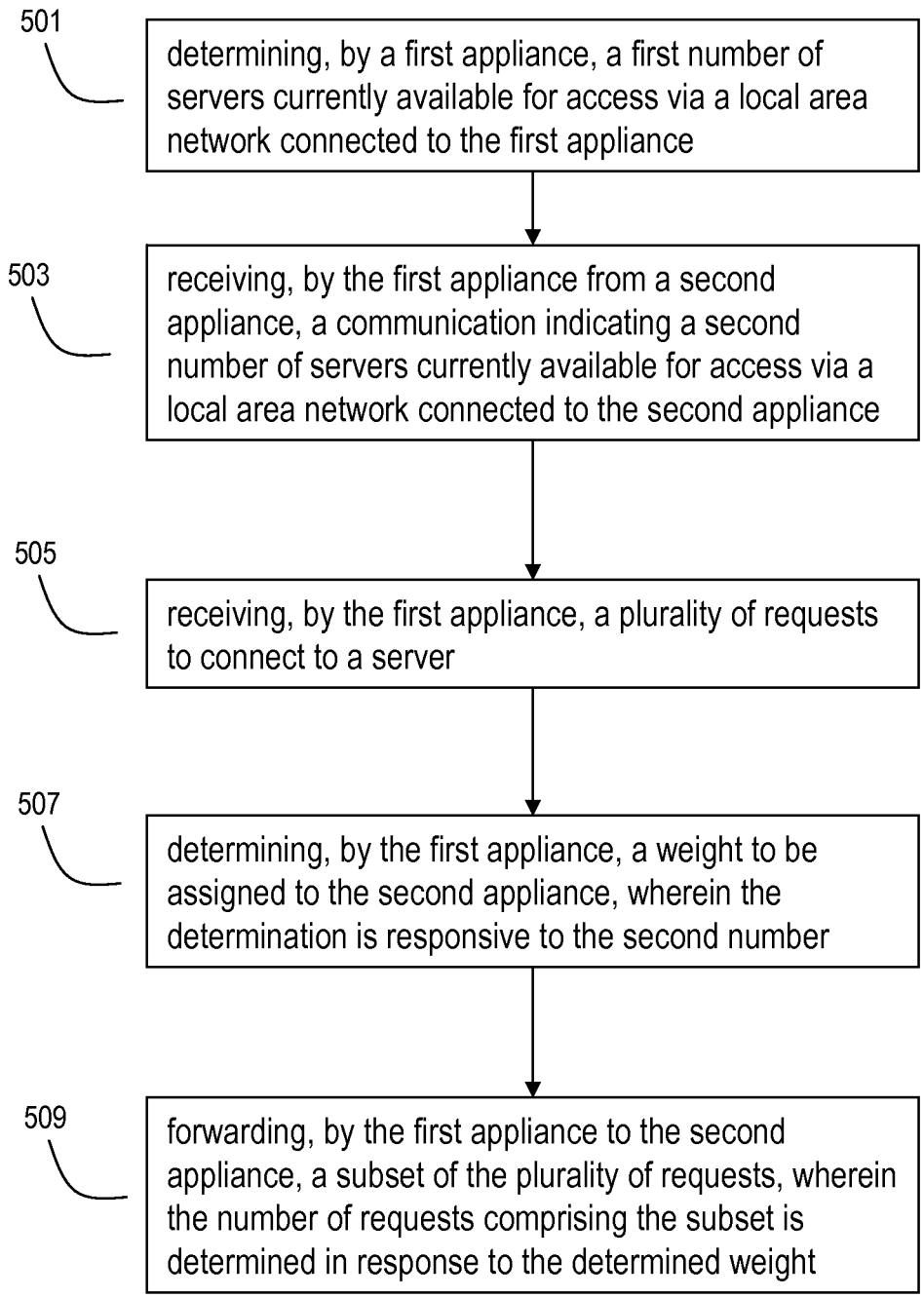
FIG. 5 is a flow diagram of a method for enabling decentralized dynamic load balancing among a plurality of appliances providing access to a plurality of sites, each site comprising a local area network and at least one server.

Referring now to FIG. 5, a flow diagram of a method for enabling decentralized dynamic load balancing among a plurality of appliances providing access to a plurality of sites, each site comprising a local area network and at least one server is shown. In brief overview, the method comprises: determining, by a first appliance, a first number of services currently available for access via a local area network connected to the first appliance (step 501); receiving, by the first appliance from a second appliance, a communication indicating a second number of services currently available for access via a local area network connected to the second appliance (step 503); receiving, by the first appliance, a plurality of requests to connect to a service (step 505); determining, by the first appliance, a weight to be assigned to the second appliance, wherein the determination is responsive to the second number (step 507); and forwarding, by the first appliance to the second appliance, a subset of the plurality of requests, wherein the number of requests comprising the subset is determined in response to the determined weight (step 509).

Still referring to FIG. 5, now in greater detail, a first appliance 200 determines a first number of services currently available for access via a local area network connected to the first appliance (step 501). The first appliance may determine the availability of the servers on the local area network using any means. In one embodiment, the appliance may use one or more monitoring agents 420 to determine the availability of the services 270. In another embodiment, the appliance may compute a sum of the weights of a plurality of monitors to determine whether a service is available, as will be discussed in conjunction with FIG. 6. In some embodiments, the appliance may determine, at a regular interval, a number of services currently available for access via a local area network connected to the first appliance. In other embodiments, the appliance may determine, in response to an event such as a client request, a number of services currently available for access via a local area network connected to the first appliance.

In one embodiment, the first appliance 200 may determine a sum of weights of services currently available for access via a local area network connected to the second appliance. For example, if an appliance determines three services 270 are available, each having a weight of 40, the appliance may determine the sum of weights of services currently available for access to be 120. These weights may be assigned or configured according to any method described herein.

In one embodiment, the first appliance may determine a number of available services providing a given network service. For example, the first appliance may determine the number of currently available HTTP services. Or, for example, the first appliance may determine the number of currently available FTP services. In another embodiment, the first appliance may determine a number of available services providing a given application. For example, the first appliance may determine a number of available electronic mail services, or a number of available services for streaming a word processing application.

After determining, by a first appliance, a first number of services currently available for access via a local area network connected to the first appliance (step 501); the first appliance may receive from a second appliance, a communication indicating a second number of services currently available for access via a local area network connected to the second appliance (step 503). This communication may be received via any protocol. In some embodiments, the first appliance may receive, from a plurality of appliances, a plurality of communications, wherein each communication indicates a number of services currently available for access via a local area network connected to one of the plurality of appliances.

In some embodiments, the first appliance may receive at regular intervals, from a second appliance, a communication indicating a second number of services currently available for access via a local area network connected to the second appliance. In other embodiments, the first appliance may receive in response to an event, from a second appliance, a communication indicating a second number of services currently available for access via a local area network connected to the second appliance.

In one embodiment, the first appliance may receive, from a second appliance, a communication indicating a second number, the second number comprising a sum of weights of services currently available for access via a local area network connected to the second appliance. In another embodiment, the first appliance may receive, from a plurality of appliances, a plurality of communications wherein each communication indicates a number comprising a sum of weights of services currently available for access via a local area network connected to one of the plurality of appliances.

After receiving, by the first appliance from a second appliance, a communication indicating a second number of services currently available for access via a local area network connected to the second appliance (step 503); the first appliance may receive a plurality of requests to connect to a service (step 505). The first appliance may receive the requests from one or more clients, servers, or other appliances. In some cases, the plurality of requests may all be received within a given time period. The requests may comprise any connection request, including without limitation a TCP connection request, an SSL connection request, an HTTP connection request, and an FTP connection request.

After receiving a plurality of requests to connect to a service (step 505); the first appliance may determine a weight to be assigned to the second appliance, wherein the determination is responsive to the second number (step 507). In some embodiments, the appliance may determine weights at given intervals. In other embodiments, the appliance may determine weights in response to events. In some embodiments, the appliance may determine weights prior to receiving any requests for a service.

In some embodiments, the determined weight may be a ratio of the number of services available via the second appliance to the number of service available via the first appliance. For example, a first appliance may determine that 10 of the services connected to the first appliance are available. A second appliance may report that 5 of the services in the branch office the second appliance provides access to are available. The total number of other available services may thus be 10. In this example, the first appliance may determine to assign the second appliance a weight of 5, while assigning itself a weight of 10. Or, in this example, the first appliance may determine to assign the second appliance a weight of 10, while assigning itself a weight of 20. As another example, a first appliance may determine that 250 is the sum of the weights of the available services connected to the first appliance. A second appliance may report that 500 is the sum of the weights of the available services connected to the second appliance. In this example, the first appliance may determine to assign the second appliance a weight of 2, while assigning itself a weight of 1. Or, in this example, the first appliance may determine to assign the second appliance a weight of 20, while assigning itself a weight of 10.

In another embodiment, the first appliance may assign a weight to the second appliance, wherein the weight is determined in response to the ratio of the second number to a sum of the first number and at least one number received from a third appliance. For example, a first appliance may determine that 10 of the services connected to the first appliance are available. A second appliance may report that 5 of the services in the branch office the second appliance provides access to are available. A third appliance may report that 15 of the services in the branch office the second appliance provides access to are available. The sum of other available services may thus be 25. In this example, the first appliance may determine to assign the second appliance a weight of 1, while assigning itself a weight of 2, and assigning the third appliance a weight of 3. Or, in this example, the first appliance may determine to assign the second appliance a weight of 10, while assigning itself a weight of 20, and assigning the third appliance a weight of 30. As another example, a first appliance may determine that 300 is the sum of the weights of the available services connected to the second appliance. A second appliance may report that 500 is the sum of the weights of the available services connected to the second appliance. A third appliance may report that 100 is the sum of the weights of the available services connected to the third appliance. In this example, the first appliance may determine to assign the second appliance a weight of 5, while assigning itself a weight of 3, and assigning the third appliance a weight of 1.

Or, in this example, the first appliance may determine to assign the second appliance a weight of 30, while assigning itself a weight of 20, and assigning the third appliance a weight of 10.

In other embodiments, the weight assigned to the second appliance may be determined in response to numbers of available servers received from 4, 5, 6, 7, 8, 9, 10, 16, 20, 30, 32, 64, 100, or any other number of other appliances. In other embodiments, the weight assigned to the second appliance may be determined in response to sums of weights of available servers received from 4, 5, 6, 7, 8, 9, 10, 16, 20, 30, 32, 64, 100, or any other number of other appliances.

After assigning a weight to the second appliance (step 507); the first appliance may forward, to the second appliance, a subset of the plurality of requests, wherein the number of requests comprising the subset is determined in response to the determined weight (step 509). The requests may be forwarded according to any of the protocols described herein.

In one embodiment, the first appliance may forward a number of requests to the second appliance proportionate to the assigned weights of the first and second appliances. For example, if the first appliance has a weight of 10, and the second appliance has a weight of 20, the first appliance may forward ⅔ of incoming requests to the second appliance. Or, for example, if the first appliance has a weight of 10, the second appliance has a weight of 20, and a third appliance has a weight of 10, the first appliance may forward ½ of the incoming requests to the second appliance. In this example, the first appliance may then forward ¼ of the incoming requests to the third appliance, and service ¼ of the requests itself.

The subset of requests forwarded to the second appliance may be determined using any weighted load-balancing method. In one embodiment, the first appliance may use a weighted round-robin method. In another embodiment, the first appliance may always forward incoming requests to the appliance with the highest weight. In some embodiments, the appliance may forward incoming requests as they are received. In another embodiment, the appliance may buffer incoming requests and then forward multiple requests simultaneously.

Figure 6:
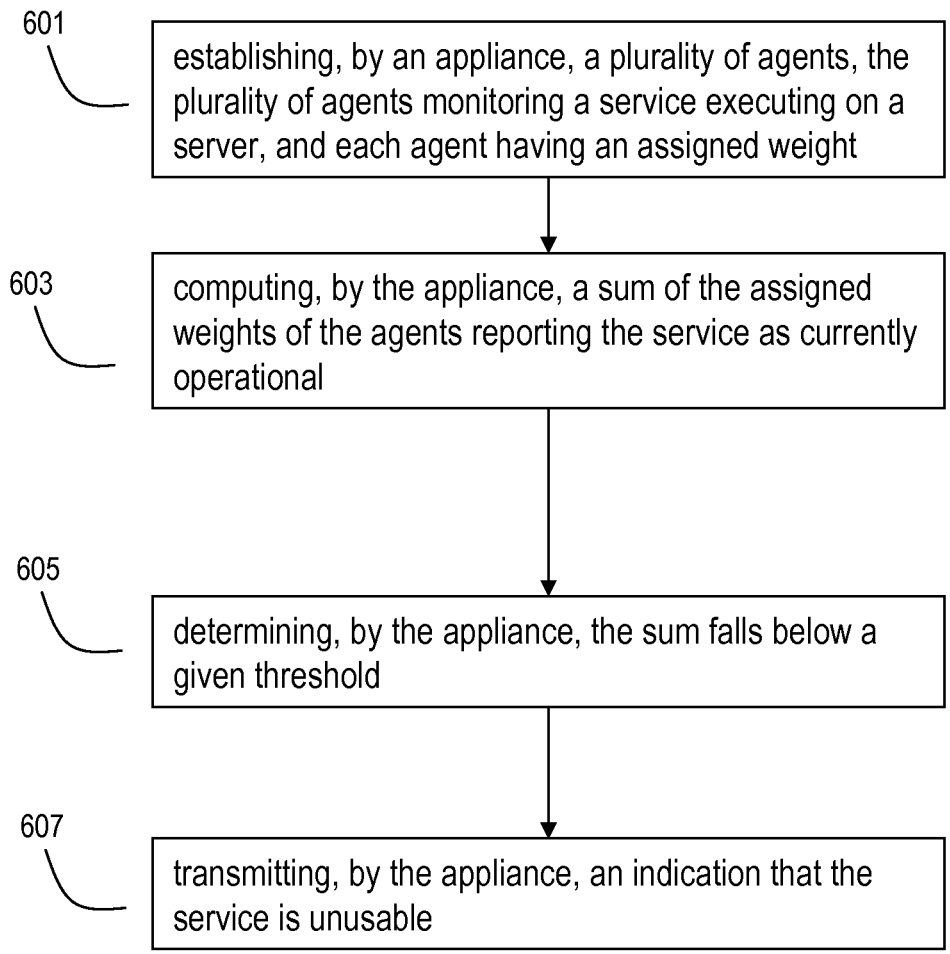
FIG. 6 is a flow diagram of a method for enabling decentralized dynamic load balancing among a plurality of appliances providing access to a plurality of sites, each site comprising a local area network and at least one server.

Referring now to FIG. 6, a flow diagram of a method for determining service availability using a plurality of weighted monitoring agents is shown. In brief overview, the method comprises: establishing, by an appliance, a plurality of agents, the plurality of agents monitoring a service executing on a server, and each agent having an assigned weight (step 601); computing, by the appliance, a sum of the assigned weights of the agents reporting the service as currently operational (step 603); determining, by the appliance, the sum falls below a given threshold (step 605); and transmitting, by the appliance, an indication that the service is unusable (step 607).

Still referring to FIG. 6, now in greater detail, an appliance establishes a plurality of agents, the plurality of agents monitoring a service executing on a server, and each agent having an assigned weight (step 601) The monitoring agents 420 may comprise any monitoring agent 420 described herein, and may be assigned a weight according to any of the methods described herein. In one embodiment, the appliance may establish the plurality of monitoring agents upon boot-up of the appliance. In another embodiment, the appliance may establish the plurality of monitoring agents upon startup of the server.

After establishing the monitoring agents (step 601); the appliance may compute a sum of the assigned weights of the agents reporting the service as currently operational (step 603). In some embodiments, the appliance may determine whether an agent is reporting the service as operational based on a response time the agent reports for the server. For example, an appliance may be configured to treat as non-operational any service with a response time greater than 3 seconds. Or, for example, an appliance may treat as non-operational any response time from an HTTP monitoring agent greater than 2 seconds, while treating as non-operation any response time from a UDP monitoring agent greater than 0.5 seconds. In another embodiment, the appliance may use a rolling average of an agent's reported response time for the server to determine whether the server is available.

In some embodiments, the appliance may compute the sum of the assigned weights of the agents reporting the service as currently operational at predefined regular intervals. For example, the appliance may compute the sum once every 0.1, 0.5. 1, 2, 3, 4, 5, or 10 seconds. In other embodiments, the appliance may compute the sum of the assigned weights of the agents reporting the service as currently operational in response to an event, such as a client request, or a communication from another appliance.

After computing a sum of the assigned weights of the agents reporting the service as currently operational (step 603); the appliance may determine the sum falls below a given threshold (step 605). The threshold may be any number. In some embodiments, the threshold may be configured by an administrator. In some embodiments, the threshold may be set such that the threshold represents a given fraction of the total weights of the monitoring agents. For example, if there are four monitoring agents, each with a weight of 10, the threshold may be set to 20, such that if the sum of the assigned weights of the agents reporting the service as currently operational falls below the threshold, it indicates more than half of the agents report the service as unavailable.

After determining the sum falls below a given threshold (step 605); the appliance may transmit an indication that the service is unusable (step 607). In some embodiments, the appliance may transmit the indication to a client. In another embodiment, the appliance may transmit the indication to a second appliance. In some embodiments, the appliance may transmit the indication to a second appliance in the course of reporting a number of available services. In some embodiments, a recipient of the transmission may use the transmission for load balancing methods, such as those described in conjunction with FIG. 5.

D. Dynamic Connection Spillover

Figure 7:
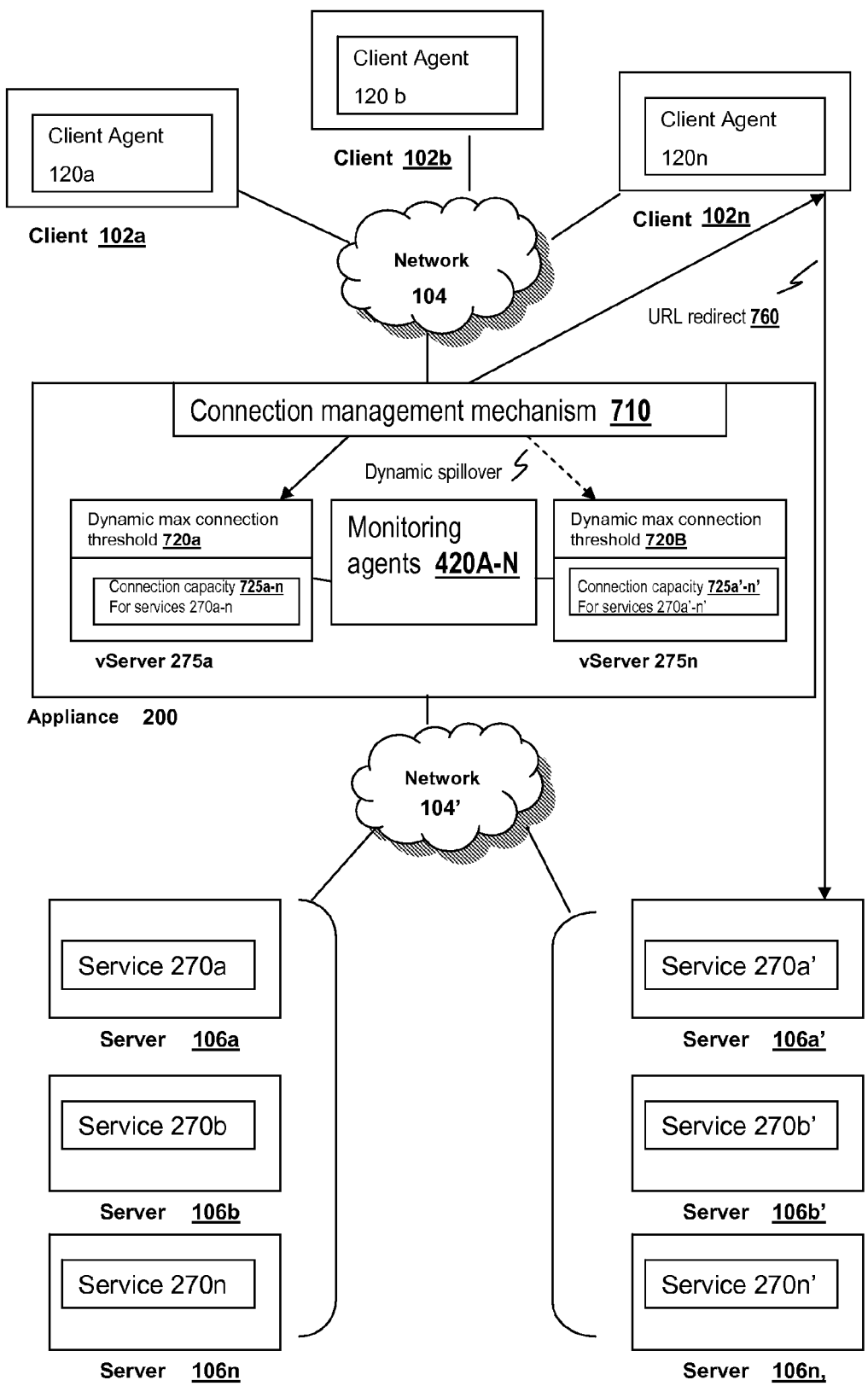
FIG. 7 is an embodiment of an appliance for providing a technique of dynamic connection threshold management.

Referring now to FIG. 7, an embodiment of a system for providing management of transport layer connections via an appliance using a dynamic maximum connection threshold is depicted. In brief overview, the appliance 200 establishes a first vServer 275A to load balance 284 a plurality of clients 102a-102n access to one or more services 270A-270N of a first set of servers 106A-106N. The appliance 200 includes a connection management mechanism 710 for managing and balancing transport layer connection requests from clients 102a-102n to one or more set of services 270A-270N. The appliance 200 establishes for the first vServer 275A a maximum dynamic connection threshold 720A based on the sum of the connection capacity 725A-725N each of the services 270A-270N are targeted or configured to handle. Via monitoring agents 420A-420N, the appliance monitors the operational status of each of the services 270A-270N. If any of the services 270A-270N have a change in status from available to not available, or not available to available, the appliance 200 adjusts the dynamic maximum connection threshold 720A by including or not including the corresponding connection capacity 725A-72B of the service in the summation of the threshold. For example, if the appliance 200 detects a first service 270A has a status of not available, the appliance 200 subtracts the connection capacity 725A of the first service 270A from the maximum dynamic connection threshold 720A. As such, the appliance 200 dynamically adjusts the maximum connection threshold 720 for a vServer 275 in real-time in accordance with the monitored status of the services 270A-270N and each service's corresponding connection capacity 725A-725N.

In further detail, the connection management mechanism 710 comprises software, hardware, or any combination of software and hardware having logic, functions or operations for receiving and managing connection requests and communications from one or more clients 102A-102N. In one embodiment, the connection management mechanism 710 receives or intercepts transport layer connection requests and communications between the clients 102A-102N and one or more services 270A-270N. The connection management mechanism 710 may include an application, program, service, process, task, thread or any type and form of executable instructions. In another embodiment, the connection management mechanism 710 identifies, determines or selects a vServer 275 for processing a received communication from a client 102.

In some embodiments, the connection management mechanism 710 determines if the dynamic maximum connection threshold 720 has been reached or exceeded. The connection management mechanism 710 determines if the dynamic maximum connection threshold is exceeded, and whether or not to establish a backup or second vServer 275N, e.g., a spillover vServer. Upon detecting the number of active transport layer connections of the first vServer 275A exceeds the dynamically adjusted maximum connection threshold 720, the connection management mechanism 710 may direct, transfer or otherwise provide a received transport layer connection request of a client 102 to the second vServer 275N for handling. By using the dynamically adjusted maximum connection threshold 720, the connection management mechanism 710 dynamically and automatically spillovers connection requests from clients 102 from a first vServer 275A to a backup or second vServer 275N.

In other embodiments, the connection management mechanism 710 may maintain connection or session persistence between a client 102 and the vServer 275A-275N handling requests for the client 102. In some embodiments, the connection management mechanism 710 selects the spillover vServer 275N for handling a client request even though the number of active connections of the first vServer 275A does not exceed the maximum connection threshold 720. In other embodiments, the connection management mechanism 710 selects the first vServer 275A for handling a client request event though requests from other clients are directed to the spillover vServer 275N. In one embodiment, the connection management mechanism 710 may select the first vServer 275A or second vServer 275N based on which vServer 275 most recently handled a request from the client 102.

Upon detecting the dynamically adjusted maximum connection threshold 720 has been exceeded for the first vServer 275A and/or the second vServer 275N, the connection management mechanism 710, in one embodiment, may determine not to establish another spillover vServer 275N but instead redirects the client 102 directly to a server 106 or otherwise to bypass the appliance 200. For example, the connection management mechanism 710 may determine the dynamically adjusted maximum connection threshold 720B for the spillover vServer 275N has been reached and may redirect the client 102 to bypass the appliance 200 instead of establishing a third vServer 275N for spillover. In these embodiments, the connection management mechanism 710 may transmit a redirect Uniform Resource Locator (URL) 760 to the client 102 for the client 102 to connect to in response to the client's connection request. The URL 760 may identify any one of the servers 106 or services 270.

In yet another embodiment, the appliance 200 and/or connection management mechanism 710 manages the number of active connections and performs dynamic spillover techniques for a plurality of vServers 275A-275N. In one embodiment, the second vServer 275B may be managing connections from a plurality of clients 102A-102N to a second set of services 270A'-270N'. In some embodiments, the appliance 200 monitors a second dynamic maximum connection threshold 720B for a second vServer 275B. In one embodiment, the second vServer 275B may be acting as a spillover vServer for the first vServer 275N or a third vServer.

The connection capacity 725 for a service 270 comprises a predetermined number of clients, transport layer connections or users a service 270 is designed, configured or intended to handle or process. In some embodiments, the connection capacity 725 comprises a maximum number of clients, connections or users 725 a service 270 is configured, targeted or intended to handle or process. In one embodiment, a user, such as the administrator of the appliance 200 configures the connection capacity 725 for the service 270. In another embodiment, the appliance 200 determines the connection capacity 725 from the service 270 or server 106 providing the service 270. For example, the appliance 200 may transmit a request to the server 106 or service 270 for its connection capacity, and in response, the server 106 transmits to the appliance a predetermined number of active connections it may handle.

Each of the connection capacities 725A-725N may comprise any combination of a same or different connection capacity 725 as another capacity. In one embodiment, the connection capacity 725A for a first server 270A is different than the connection capacity 725B of a second server 270B. In some embodiments, the connection capacity 725A for a first service 270A is the same as the connection capacity 725B for a second service 270B. In another embodiment, the connection capacity 725A of a service 270A may be set to a value below the service's actual connection capacity. In other embodiments, the connection capacity 725A of a service 270A may be set to a value above the service's actual connection capacity. In some embodiments, the connection capacities may represent a connection-based weighting of each of the services 270A-270N in a first set or second set of a plurality of services.

The dynamic maximum connection threshold 720A-720N (generally 702) comprises a predetermined number identifying a maximum number of active transport layer connections the vServer 275 is configured, designed or otherwise intended to process, handle or have active. In one embodiment, a user, such as an administrator of the appliance 200, configures the dynamic maximum connection threshold 720. In another embodiment, the appliance 200 sets the dynamic maximum connection threshold 720 to a default value of the sum of the configured connection capacity for each of the services 270A-270N managed by the vServer 275.

The appliance 200 may adjust the dynamic maximum connection threshold 720 in response to events corresponding to a vServer 250 and to one or more services 270. The appliance 200 may monitor the services 270 using one or more monitoring agents 420. In one embodiment, the appliance may adjust the dynamic maximum connection threshold in response to a monitoring agent 420 reporting a service 270 as unavailable. If a service 270 with a given connection capacity is reported as unavailable, the appliance may subtract the service's 270 connection capacity from the dynamic maximum connection threshold 720 of the vServer providing access to that service 270. Further, if the service 270 previously reported as unavailable is then reported as available, the appliance 200 may then add back the connection capacity for that service 270 to the dynamic maximum connection threshold 720.

The monitoring agents may monitor any aspect of a service 270, and may use any technique to determine whether a given service is available. In one embodiment, a monitor may measure the response time of a service 270 and report the service as unavailable if the response time exceeds a given threshold. In another embodiment, a monitor may measure the response time of a service 270 and report the service as unavailable if the response time exceeds a determined average response time for the service 270. In still another embodiment, a monitor may measure the response time of a service 270 and report the service 270 as unavailable if the response time exceeds a given deviation from a determined average response time for the service.

Although the technique of dynamically adjusted maximum connection threshold 720 is generally discussed in view of transport layer connections and connection requests, the appliance may perform this technique for any type and form of transport layer protocol or application layer protocol carried via the transport layer. In one embodiment, the appliance 200 may perform dynamic connection spillover among vServers 275A-275N using a dynamically adjusted maximum connection threshold 720 for Secure Socket Layer (SSL) or Transport Layer Security (TLS) connections and connection requests.

Figure 8:
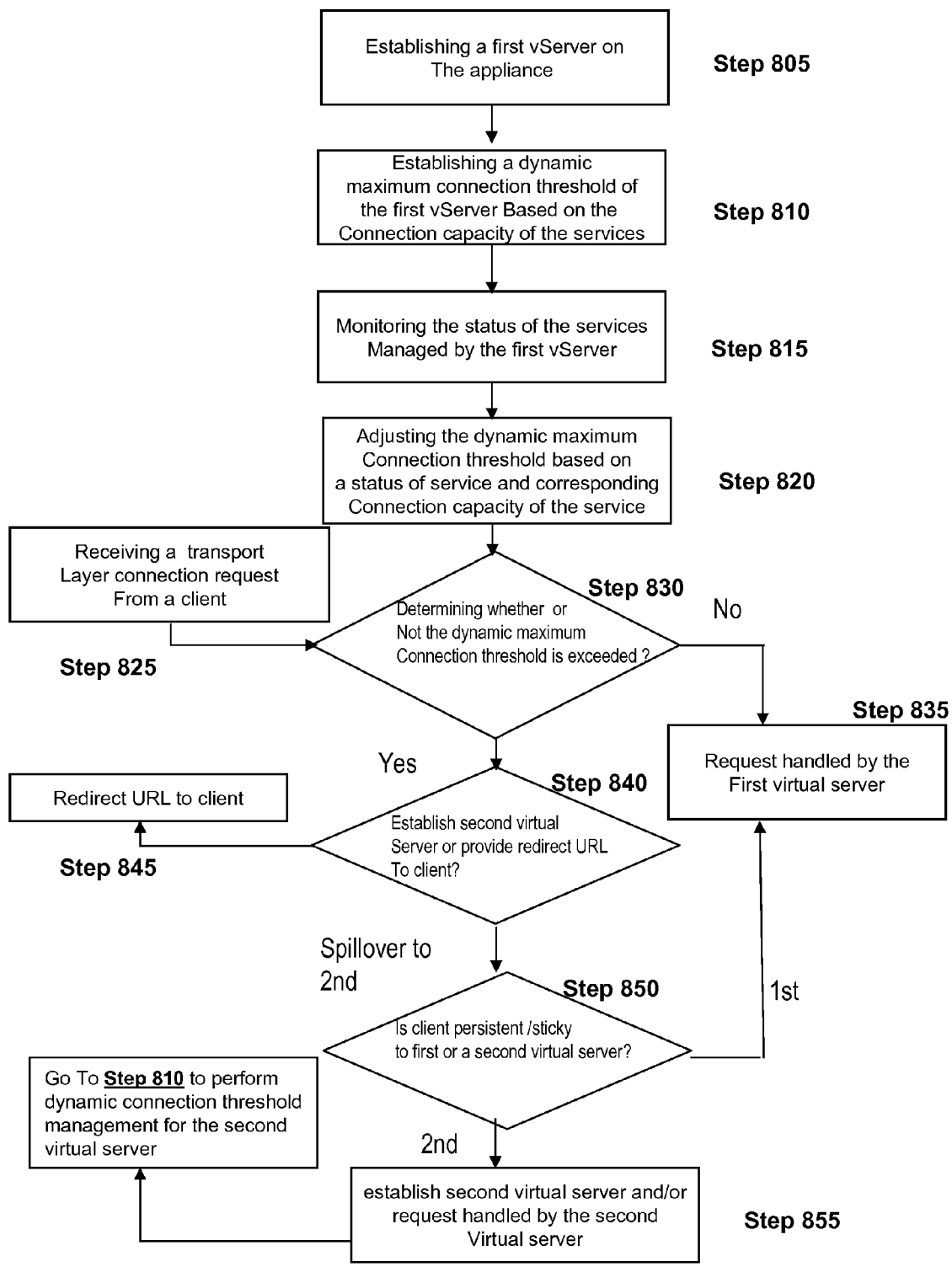
FIG. 8 is a flow diagram of steps of an embodiment of a method for practicing a technique of dynamic connection threshold management in conjunction with the system of FIG. 7.

Referring now to FIG. 8, steps of an embodiment of a method for practicing a technique of dynamical spillover management is depicted. In brief overview, the method comprises establishing, on an appliance, a first virtual server which directs transport layer connection requests from a plurality of clients to a first plurality of services (step 805); establishing, via the appliance, a predetermined threshold identifying a maximum active transport layer connection capacity for the first virtual server, the predetermined threshold comprising a sum of a predetermined connection capacity for each of the plurality of services (step 810); monitoring, by the appliance, a status for each of the plurality of services (step 815); and adjusting, by the appliance, the predetermined threshold to comprise the sum of the predetermined connection capacity for each of the plurality of services having a status of available (step 820). The appliance may then receive a transport layer connection request (step 825); determine that a number of active connections to the first virtual server exceeds the predetermined threshold (step 830). The appliance may then determine to provide the request to a second virtual server (step 840).

Still referring to FIG. 8, now in greater detail, an appliance establishes a first virtual server which directs transport layer connection requests from a plurality of clients to a first plurality of services (step 805). This virtual server may comprise any virtual server capable of providing access to one or more services 270. In one embodiment, the virtual server may comprise a vServer 250. In one embodiment, the appliance may establish the virtual server upon startup of the appliance. In another embodiment, the appliance may establish the virtual server in response to a previously established virtual server exceeding maximum connection threshold. In one embodiment, the appliance may establish a plurality of virtual servers.

In the embodiment shown, the appliance may then establish a dynamic maximum connection threshold 720 for the first virtual server (step 810). In some embodiments, the threshold comprises a sum of a predetermined connection capacity for each of the plurality of services. In one embodiment, the threshold 720 may be initially configured by a user or administrator of the appliance. In another embodiment, the threshold 720 may be initially determined by the appliance by polling one or more services 270.

In the embodiment shown, the appliance may then monitors a status for each of the plurality of services (step 815). The appliance may monitor a status for each of the services 270 using any means. In one embodiment, the appliance may use a monitoring agent 420. In another embodiment, the appliance may use a plurality of monitoring agents 420. In one embodiment, the appliance may monitor the status for each of the services at predetermined time intervals, for example once every 0.01, 0.1, 0.2, 0.5, or 1 seconds. In another embodiment, the appliance may monitor the status for each of the services 270 asynchronously.

In the embodiment shown, the appliance may then adjust the predetermined threshold to comprise the sum of the predetermined connection capacity for each of the plurality of services having a status of available (step 820). For example, if a service 270 with a given connection capacity is reported as unavailable, the appliance may subtract the service's 270 connection capacity from the dynamic maximum connection threshold 720 of the vServer providing access to that service 270. Further, if a service 270 previously reported as unavailable is then reported as available, the appliance 200 may then add back the connection capacity for that service 270 to the dynamic maximum connection threshold 720.

In the embodiment shown, the appliance may then receive a transport layer connection request (step 825). The transport layer request may comprise any request to connect to a service 270. The transport layer request may be received from any computing device including a client 102, server 106, or a second appliance 200. In one embodiment, the request may identify a type of service 270. For example, the transport layer request may comprise a request for HTTP service. Or, for example, the transport layer request may comprise a request for UDP service.

In the embodiment shown, the appliance may then determine whether the dynamic maximum connection threshold 720 of the first virtual server has been exceeded. The appliance may compare the current connection load for the first virtual server with the current value of the dynamic maximum connection threshold for the first virtual server. In one embodiment, the first virtual server may comprise a primary or default virtual server. In another embodiment, the first virtual server may comprise a primary or default virtual server for a particular type of service. If the dynamic maximum connection threshold 720 of the first virtual server has not been exceeded, the appliance may provide the connection request to the first virtual server (step 835).

If the dynamic maximum connection threshold 720 of the first virtual server has been exceeded, the appliance may establish, in response to the threshold being exceeded, a second virtual server (step 840). In other embodiments, a second virtual server may already have been established prior to some or any of the steps shown. The second virtual server may provide access to a second plurality of services 270. In one embodiment, one or more of the second plurality of services 270 may comprise the same type of service 270 as one or more of the first plurality of services. The appliance may then establish and subsequently adjust a dynamic maximum connection threshold 720 corresponding to the second virtual server. The appliance may then provide the connection request to the second virtual server 200 (step 855).

In other embodiments, a second virtual server may already have been established prior to some or any of the steps shown. The second virtual server may provide access to a second plurality of services 270. In one embodiment, one or more of the second plurality of services 270 may comprise the same type of service 270 as one or more of the first plurality of services. The appliance may then provide the connection request to the second virtual server 200 (step 855). The appliance may then establish and subsequently adjust a dynamic maximum connection threshold 720 corresponding to the second virtual server.

In still other embodiments, if the dynamic maximum connection threshold 720 of the first virtual server has been exceeded, the appliance may, in response to the threshold being exceeded, redirect the client making the request to another resource. In one embodiment, the appliance may transmit a URL to the client comprising the address of a server 106 or service 270 such that the client may bypass the appliance 200 and access the server 106 or service 270 directly. In one embodiment, the appliance may transmit a URL to the client comprising the address of a second appliance 200. In still another embodiment, the appliance 200 may redirect the client request to a second appliance based on a dynamically determined connection capacity for the second appliance as discussed in conjunction with FIG. 5.

The appliance 200 may then determine whether the client making the connection request has a previously existing connection with either the first or a second virtual server (step 850). In some embodiments, an appliance may assign a priority to providing connection requests from a client to virtual servers that have previously serviced or are currently servicing connections from the client. For example, if a connection request is received from a client, and the client has a currently existing connection with a first virtual server, the appliance 200 may provide the connection request to the first virtual server even if the first virtual server is above its dynamic maximum connection threshold. Or, for example, if a client has a previous connection via a backup virtual server, and the primary virtual server subsequently becomes available again, the appliance 200 may still provide a subsequent connection request from the client to the backup virtual server. In one embodiment, a connection management mechanism 710, or other appliance component may track previously established or current connections so that incoming connection requests from a client can be provided to a virtual server having previously serviced connections from the client.

While the invention has been particularly shown and described with reference to specific embodiments, it should be understood by those skilled in the art that various changes in form and detail may be made therein without departing from the spirit and scope of the invention as defined by the appended claims

The invention claimed is:

1. A method for redirecting transport layer connection requests responsive to an adjusted threshold of a number of clients, the method comprising:
    (a) identifying, by a device intermediary to a plurality of clients and a plurality of services executing on one or more servers, a subset of the plurality of services that are identified as available;
    (b) identifying, by the device, for each service of the subset of the plurality of services, a number of clients the service is configured to handle;
    (c) establishing, by the device, a threshold for a first virtual server that directs connection requests from the plurality of clients to the plurality of services, the threshold comprising a sum of the identified number of clients each service of the subset of the plurality of services is configured to handle;
    (d) monitoring, by the device, a status of each of the subset of the plurality of services, the status of at least one of the subset of the plurality of services is identified as unavailable;
    (e) adjusting, by the device responsive to monitoring, the sum of the threshold to exclude for those services of the plurality of services that are currently identified as unavailable the number of clients those services are configured to handle;
    (f) determining, by the device, a number of clients of the first virtual server exceeds the adjusted threshold; and
    (g) establishing, by the device in response to the determination, a second virtual server for directing transport layer connection requests from the plurality of clients to a second plurality of services.

2. The method of claim 1, further comprising receiving, by the device, a transport layer connection request from a client of the plurality of clients.

3. The method of claim 2, further comprising providing, by the device, the transport layer connection request to the second virtual server to handle.

4. The method of claim 1, further comprising establishing, by the device, a second threshold for the second virtual server, the second threshold comprising a second sum of a second number of clients for each service of the second plurality of services of the second virtual server that is currently identified as available.

5. The method of claim 1, wherein step (d) further comprises monitoring, by the device using a plurality of monitoring agents, responses from the subset of the plurality of services to requests generated by the monitoring agents using a predetermined protocol.

6. The method of claim 1, wherein step (d) further comprises determining, by the device, the status of each service of the subset of the plurality of services in accordance with a predetermined frequency.

7. The method of claim 1, wherein step (e) further comprises subtracting, by the device, the number of clients for the unavailable service from the sum of the threshold.

8. The method of claim 1, wherein step (e) further comprises recomputing, by the device, the sum of the number of clients for only those services that are currently identified as available responsive to monitoring.

9. The method of claim 1, further comprising determining, by the device, from monitoring that a service that was unavailable is currently available and including the number of clients for the service in the sum of the threshold.

10. The method of claim 1, wherein the number of clients is the maximum number of clients each service is configured to handle.

11. A system for redirecting transport layer connection requests responsive to an adjusted threshold of a number of clients, the system comprising:
    a device intermediary to a plurality of clients and a plurality of services executing on one or more servers, wherein the device is configured to
        identify a subset of the plurality of services that are identified as available,
        identify, for each service of the subset of the plurality of services, a number of clients the service is configured to handle,
        establish a threshold for a first virtual server that directs connection requests from the plurality of clients to the plurality of services, the threshold comprising a sum of the identified number of clients each service of the subset of the plurality of services is configured to handle;

a monitor of the device configured to monitor a status of each of the subset of the plurality of services, the status of at least one of the subset of the plurality of services is unavailable;

wherein responsive to the monitor, the device is configured to adjust the sum of the threshold to exclude for those services of the plurality of services that are currently identified as unavailable the number of clients those services are configured to handle; and wherein the device is configured to determine that a number of clients of the first virtual server exceeds the adjusted threshold and, responsive to the determination, to establish a second virtual server for directing transport layer connection requests from the plurality of clients to a second plurality of services.

12. The system of claim 11, wherein the device is further configured to receive a transport layer connection request from a client of the plurality of clients.

13. The system of claim 12, wherein the device is further configured to provide the transport layer connection request to the second virtual server to handle.

14. The system of claim 11, wherein the device is further configured to establish a second threshold for the second virtual server, the second threshold comprising a second sum of a second number of clients for each service of the second plurality of services of the second virtual server that is currently identified as available.

15. The system of claim 11, wherein monitor is further configure to monitor responses from the subset of the plurality of services to requests generated by the monitor using a predetermined protocol.

16. The system of claim 11, wherein the monitor is further configured to determine the status of each service of the subset of the plurality of services in accordance with a predetermined frequency.

17. The system of claim 11, wherein the device is further configured to subtract the number of clients for the unavailable service from the sum of the threshold.

18. The system of claim 11, wherein the device is further configured to recompute the sum of the number of clients for only those services that are currently identified as available responsive to monitoring.

19. The system of claim 11, wherein the device is further configured, to determine, responsive to the monitor, that a service that was unavailable is currently available and to include the number of clients for the service in the sum of the threshold.

20. The system of claim 11, wherein the number of clients is the maximum number of clients each service is configured to handle.

* * * * *